(12) United States Patent
Snell et al.

(10) Patent No.: US 10,192,262 B2
(45) Date of Patent: Jan. 29, 2019

(54) SYSTEM FOR PERIODICALLY UPDATING BACKINGS FOR RESOURCE REQUESTS

(71) Applicant: nCino, Inc., Wilmington, NC (US)

(72) Inventors: Nathan Snell, Wilmington, NC (US); Neil Underwood, Wilmington, NC (US); Matthew Lukens, Rocky Point, NC (US); Jaco Raubenheimer, Atlanta, GA (US); David Patrick, Atlanta, GA (US); M. Pullen Daniel, Jr., Wilmington, NC (US); Pierre Naude, Wilmington, NC (US); Chris Worel, Wilmington, NC (US); Rick Norris, Whiteville, NC (US); M. Scott Toler, Wilmington, NC (US); Tim Batchelor, Wilmington, NC (US); Taylor Adkins, Wilmington, NC (US); Kenneth Yeung, Wilmington, NC (US)

(73) Assignee: nCino, Inc., Wilmington, NC (US)

( * ) Notice: Subject to any disclaimer, the term of this patent is extended or adjusted under 35 U.S.C. 154(b) by 0 days.

(21) Appl. No.: 15/485,138

(22) Filed: Apr. 11, 2017

(65) Prior Publication Data
US 2017/0270602 A1 Sep. 21, 2017
US 2018/0349983 A9 Dec. 6, 2018

Related U.S. Application Data

(63) Continuation-in-part of application No. 15/289,440, filed on Oct. 10, 2016, now Pat. No. 10,013,237,
(Continued)

(51) Int. Cl.
*G06F 7/00* (2006.01)
*G06Q 40/00* (2012.01)
(Continued)

(52) U.S. Cl.
CPC .............. *G06Q 40/00* (2013.01); *G06F 7/26* (2013.01); *G06F 9/5005* (2013.01); *G06F 17/30082* (2013.01); *G06F 17/30115* (2013.01); *G06F 17/30126* (2013.01); *G06F 17/30359* (2013.01); *G06F 17/30371* (2013.01); *G06F 17/30424* (2013.01); *G06F 17/30486* (2013.01);
(Continued)

(58) Field of Classification Search
USPC .......... 707/608, 694, 702, 736, 791; 705/35
See application file for complete search history.

(56) References Cited

U.S. PATENT DOCUMENTS 5,630,069 A 5/1997 Flores et al.
6,029,149 A 2/2000 Dykstra et al.
(Continued)

OTHER PUBLICATIONS

U.S. Appl. No. 15/289,440, "Notice of Allowance" dated Feb. 28, 2018, 14 pages.
(Continued)

*Primary Examiner* — Cheyne D Ly
(74) *Attorney, Agent, or Firm* — Kilpatrick Townsend & Stockton LLP

(57) ABSTRACT

Techniques described herein relate to automated approval of resource requests. More specifically, resource request data is retrieved, identified, processed and aggregated to automate approval of the request.

15 Claims, 17 Drawing Sheets

Related U.S. Application Data which is a continuation-in-part of application No. 14/993,328, filed on Jan. 12, 2016, now Pat. No. 9,471,665, which is a continuation-in-part of application No. 14/590,714, filed on Jan. 6, 2015, now Pat. No. 9,268,819, which is a continuation of application No. 14/516,363, filed on Oct. 16, 2014, now Pat. No. 9,098,875, said application No. 15/289,440 is a continuation-in-part of application No. 14/713,899, filed on May 15, 2015, now Pat. No. 9,530,164, which is a continuation of application No. 14/211,138, filed on Mar. 14, 2014, now Pat. No. 9,082,151, which is a continuation-in-part of application No. 14/021,344, filed on Sep. 9, 2013, now Pat. No. 8,762,376, which is a continuation of application No. 13/673,638, filed on Nov. 9, 2012, now Pat. No. 8,572,083, application No. 15/485,138, which is a continuation-in-part of application No. 15/017,339, filed on Feb. 5, 2016, now Pat. No. 9,619,840, which is a continuation-in-part of application No. 14/848,119, filed on Sep. 8, 2015, now Pat. No. 9,418,116, application No. 15/485,138, which is a continuation-in-part of application No. 15/201,281, filed on Jul. 1, 2016.

(60) Provisional application No. 62/032,239, filed on Aug. 1, 2014, provisional application No. 62/102,196, filed on Jan. 12, 2015, provisional application No. 61/792,011, filed on Mar. 15, 2013, provisional application No. 61/714,647, filed on Oct. 16, 2012, provisional application No. 61/652,977, filed on May 30, 2012, provisional application No. 61/652,970, filed on May 30, 2012, provisional application No. 62/187,487, filed on Jul. 1, 2015, provisional application No. 62/047,474, filed on Sep. 8, 2014.

(51) Int. Cl.
    *G06F 17/30*     (2006.01)
    *G06Q 40/02*     (2012.01)
    *G06F 7/26*     (2006.01)
    *G06F 9/50*     (2006.01)
    *G06Q 10/06*     (2012.01)
    *H04L 12/24*     (2006.01)

(52) U.S. Cl.
CPC .. *G06F 17/30525* (2013.01); *G06F 17/30601* (2013.01); *G06F 17/30607* (2013.01); *G06F 17/30657* (2013.01); *G06F 17/30864* (2013.01); *G06F 17/30867* (2013.01); *G06Q 10/06312* (2013.01); *G06Q 40/025* (2013.01); *H04L 41/22* (2013.01); *G06F 2201/80* (2013.01); *G06Q 10/0635* (2013.01)

(56) References Cited

U.S. PATENT DOCUMENTS

| | | | |
|---|---|---|---|
| 6,088,686 A | 7/2000 | Walker et al. | |
| 6,105,007 A | 8/2000 | Norris | |
| 6,112,190 A | 8/2000 | Fletcher et al. | |
| 6,128,602 A | 10/2000 | Northington et al. | |
| 6,292,811 B1 | 9/2001 | Clancey et al. | |
| 6,505,176 B2 | 1/2003 | DeFrancesco, Jr. et al. | |
| 7,212,995 B2 | 5/2007 | Schulkins | |
| 7,379,913 B2 | 5/2008 | Steele et al. | |
| 7,392,222 B1 | 6/2008 | Hamilton et al. | |
| 7,415,471 B1 | 8/2008 | Coleman | |
| 7,415,741 B1 | 8/2008 | Wasley et al. | |
| 7,451,134 B2 | 11/2008 | Krakowiecki et al. | |
| 7,472,089 B2 | 12/2008 | Hu et al. | |
| 7,490,059 B2 | 2/2009 | Albee et al. | |
| 7,548,884 B1 | 6/2009 | Thomas | |
| 7,712,023 B1 | 5/2010 | Bryan | |
| 7,720,730 B2 | 5/2010 | Wiryawan et al. | |
| 7,765,136 B2 | 7/2010 | Northington et al. | |
| 7,797,217 B2 | 9/2010 | Rosen et al. | |
| 7,822,680 B1 | 10/2010 | Weber et al. | |
| 7,873,570 B2 | 1/2011 | Cagan et al. | |
| 7,949,937 B2 | 5/2011 | Wu | |
| 7,962,517 B2 | 6/2011 | Tritt et al. | |
| 7,966,253 B2 | 6/2011 | Casper et al. | |
| 7,979,297 B1 | 7/2011 | Shivananda et al. | |
| 8,117,117 B2 | 2/2012 | Hu et al. | |
| 8,126,920 B2 | 2/2012 | Hu et al. | |
| 8,140,572 B1 | 3/2012 | Ballard et al. | |
| 8,160,955 B2 | 4/2012 | Wiryawan et al. | |
| 8,176,004 B2 | 5/2012 | Malaney et al. | |
| 8,254,317 B2 * | 8/2012 | Gu | H04W 76/022 370/235 |
| 8,255,304 B1 | 8/2012 | Lorenzo | |
| 8,364,579 B2 | 1/2013 | Hu et al. | |
| 8,396,790 B2 | 3/2013 | Zafrir | |
| 8,433,650 B1 | 4/2013 | Thomas | |
| 8,489,498 B1 | 7/2013 | Flaxman et al. | |
| 8,510,332 B2 | 8/2013 | Ballard et al. | |
| 8,521,631 B2 | 8/2013 | Abrahams et al. | |
| 8,566,125 B1 | 10/2013 | Perry et al. | |
| 8,571,974 B1 | 10/2013 | Coleman | |
| 8,676,689 B1 | 3/2014 | Whelan | |
| 8,694,355 B2 | 4/2014 | Bui et al. | |
| 2002/0007332 A1 | 1/2002 | Johnson et al. | |
| 2002/0049841 A1 | 4/2002 | Johnson et al. | |
| 2002/0059137 A1 | 5/2002 | Freeman et al. | |
| 2003/0036994 A1 | 2/2003 | Witzig et al. | |
| 2003/0055668 A1 | 3/2003 | Saran et al. | |
| 2003/0145018 A1 | 7/2003 | Hitchcock et al. | |
| 2003/0185368 A1 | 10/2003 | Bradfield et al. | |
| 2003/0208412 A1 | 11/2003 | Hillestad et al. | |
| 2003/0220867 A1 | 11/2003 | Goodwin et al. | |
| 2003/0220879 A1 | 11/2003 | Gaughan et al. | |
| 2004/0003347 A1 | 1/2004 | Saidenberg et al. | |
| 2004/0030649 A1 | 2/2004 | Nelson et al. | |
| 2004/0034592 A1 | 2/2004 | Hu et al. | |
| 2004/0039666 A1 | 2/2004 | Fudali et al. | |
| 2004/0068568 A1 | 4/2004 | Griffin et al. | |
| 2004/0158520 A1 | 8/2004 | Noh | |
| 2004/0205019 A1 | 10/2004 | Painter et al. | |
| 2004/0220872 A1 | 11/2004 | Pollock, III | |
| 2005/0027651 A1 | 2/2005 | DeVault | |
| 2005/0060280 A1 | 3/2005 | Wolfston, Jr. et al. | |
| 2005/0065871 A1 | 3/2005 | Gerhart et al. | |
| 2005/0086176 A1 | 4/2005 | Dahlgren et al. | |
| 2005/0093881 A1 | 5/2005 | Okita et al. | |
| 2005/0125338 A1 | 6/2005 | Tidwell et al. | |
| 2005/0154664 A1 | 7/2005 | Guy et al. | |
| 2005/0198334 A1 | 9/2005 | Farber et al. | |
| 2005/0203834 A1 | 9/2005 | Prieston | |
| 2005/0282141 A1 | 12/2005 | Falash et al. | |
| 2006/0004651 A1 | 1/2006 | Corr et al. | |
| 2006/0036870 A1 | 2/2006 | Dasari et al. | |
| 2006/0047600 A1 | 3/2006 | Bodenheim et al. | |
| 2006/0059073 A1 | 3/2006 | Walzak | |
| 2006/0074793 A1 | 4/2006 | Hibbert et al. | |
| 2006/0106693 A1 | 5/2006 | Carlson et al. | |
| 2006/0106695 A1 | 5/2006 | Carlson et al. | |
| 2006/0206416 A1 | 9/2006 | Farias | |
| 2006/0224501 A1 | 10/2006 | Louis | |
| 2006/0265258 A1 | 11/2006 | Powell et al. | |
| 2007/0011083 A1 | 1/2007 | Bird et al. | |
| 2007/0055596 A1 | 3/2007 | Tankovich et al. | |
| 2007/0100990 A1 | 5/2007 | Brown et al. | |
| 2007/0150330 A1 | 6/2007 | McGoveran | |
| 2007/0162375 A1 | 7/2007 | Delf | |
| 2007/0198401 A1 | 8/2007 | Kunz | |
| 2007/0244805 A1 | 10/2007 | Wiryawan et al. | |
| 2007/0289956 A1 | 12/2007 | Knysh et al. | |
| 2008/0097898 A1 | 4/2008 | Hibbert et al. | |
| 2008/0103963 A1 | 5/2008 | Mahoney et al. | |
| 2008/0133391 A1 | 6/2008 | Kurian et al. | |

(56) References Cited

U.S. PATENT DOCUMENTS

| | | |
|---|---|---|
| 2008/0133402 A1 | 6/2008 | Kurian et al. |
| 2008/0172669 A1 | 7/2008 | McCullough et al. |
| 2008/0209213 A1* | 8/2008 | Astrand ............... H04L 63/083 |
| | | 713/168 |
| 2008/0209313 A1 | 8/2008 | Gonser |
| 2008/0263022 A1 | 10/2008 | Kostorizos et al. |
| 2008/0301038 A1 | 12/2008 | Anderson et al. |
| 2009/0019351 A1 | 1/2009 | Hitchcock et al. |
| 2009/0052390 A1* | 2/2009 | Gu ....................... H04W 76/022 |
| | | 370/329 |
| 2009/0055309 A1 | 2/2009 | Hu et al. |
| 2009/0078757 A1 | 3/2009 | Hanson et al. |
| 2009/0112649 A1 | 4/2009 | Wernikoff |
| 2009/0119229 A1 | 5/2009 | Fudali et al. |
| 2009/0164387 A1 | 6/2009 | Armstrong et al. |
| 2009/0164431 A1 | 6/2009 | Zivkovic et al. |
| 2009/0187512 A1 | 7/2009 | Giroux et al. |
| 2009/0248560 A1 | 10/2009 | Recce et al. |
| 2009/0319387 A1 | 12/2009 | Keithley et al. |
| 2010/0057609 A1 | 3/2010 | Sibson |
| 2010/0070950 A1 | 3/2010 | Smith et al. |
| 2010/0153827 A1 | 6/2010 | Koster et al. |
| 2010/0186066 A1 | 7/2010 | Pollard |
| 2010/0274708 A1 | 10/2010 | Allen |
| 2010/0274709 A1 | 10/2010 | Iwane |
| 2010/0287092 A1 | 11/2010 | Colman et al. |
| 2010/0293108 A1 | 11/2010 | Gurvitch et al. |
| 2010/0325584 A1 | 12/2010 | McKenzie |
| 2011/0075824 A1 | 3/2011 | Geppert et al. |
| 2011/0078012 A1 | 3/2011 | Adamec |
| 2011/0106692 A1 | 5/2011 | Moore et al. |
| 2011/0112951 A1 | 5/2011 | Gould |
| 2011/0112957 A1 | 5/2011 | Ingram et al. |
| 2011/0131122 A1 | 6/2011 | Griffin et al. |
| 2011/0145164 A1 | 6/2011 | Lavoie et al. |
| 2011/0161135 A1 | 6/2011 | Lee et al. |
| 2011/0161375 A1 | 6/2011 | Tedder et al. |
| 2011/0173093 A1 | 7/2011 | Psota et al. |
| 2011/0191303 A1 | 8/2011 | Kaufman et al. |
| 2011/0270833 A1 | 11/2011 | von Kaenel et al. |
| 2011/0296380 A1 | 12/2011 | Dvinov et al. |
| 2012/0011056 A1 | 1/2012 | Ward et al. |
| 2012/0029977 A1 | 2/2012 | Alcorn et al. |
| 2012/0143748 A1 | 6/2012 | Hu et al. |
| 2012/0191594 A1 | 7/2012 | Welch et al. |
| 2012/0203701 A1* | 8/2012 | Ayuso de Paul ..... H04L 63/061 |
| | | 705/71 |
| 2012/0215812 A1 | 8/2012 | Gilstrap et al. |
| 2012/0246060 A1 | 9/2012 | Conyack, Jr. et al. |
| 2012/0290467 A1 | 11/2012 | Shenkar et al. |
| 2013/0006844 A1 | 1/2013 | Kremen |
| 2013/0006845 A1 | 1/2013 | Kremen |
| 2013/0030985 A1 | 1/2013 | Shebesta et al. |
| 2013/0073400 A1 | 3/2013 | Heath |
| 2013/0080316 A1 | 3/2013 | Pawlusiak et al. |
| 2013/0085925 A1 | 4/2013 | Simpson |
| 2013/0179331 A1 | 7/2013 | Bennett |
| 2013/0212279 A1 | 8/2013 | Dutta et al. |
| 2013/0231962 A1 | 9/2013 | Au Li |
| 2013/0232539 A1 | 9/2013 | Polunin et al. |
| 2013/0282546 A1 | 10/2013 | Kadiwar |
| 2013/0297488 A1 | 11/2013 | Boyanov et al. |
| 2013/0332337 A1 | 12/2013 | Tran |
| 2013/0332862 A1 | 12/2013 | Mirra et al. |
| 2013/0339922 A1 | 12/2013 | Sproule |
| 2014/0129411 A1 | 5/2014 | Fudali et al. |
| 2014/0258093 A1 | 9/2014 | Gardiner et al. |
| 2014/0289098 A1 | 9/2014 | Walzak |
| 2015/0006515 A1 | 1/2015 | Hopkins |
| 2015/0081591 A1 | 3/2015 | Chakar et al. |
| 2015/0294069 A1 | 10/2015 | Shah |
| 2015/0310390 A1 | 10/2015 | Steele et al. |
| 2017/0004201 A1 | 1/2017 | Snell |
| 2017/0024187 A1 | 1/2017 | Snell |

OTHER PUBLICATIONS

Unknown, "Relationship Groups Overview", SalesForce, accessed on Jul. 18, 2016, retrieved from the internet: https://help.salesforce.com/HTViewHelpDoc?id=relgroups_about.htm&language=en_US, 3 pages.

U.S. Appl. No. 61/714,647, filed Oct. 16, 2012.

U.S. Appl. No. 61/652,970, filed May 30, 2012.

U.S. Appl. No. 61/652,977, filed May 30, 2012.

U.S. Appl. No. 61/792,011, filed Mar. 15, 2013.

U.S. Appl. No. 62/032,239, filed Aug. 1, 2014.

U.S. Appl. No. 62/047,474, filed Sep. 8, 2014.

U.S. Appl. No. 62/102,196, filed Jan. 12, 2015.

U.S. Appl. No. 62/187,487, filed Jan. 12, 2015.

U.S. Appl. No. 15/289,440 "Preinterview First Office Action" dated Sep. 25, 2017, 5 pages.

U.S. Appl. No. 14/993,328 "Preinterview First Office Action" dated Apr. 19, 2016, 5 pages.

U.S. Appl. No. 14/993,328 "First Action Interview Pilot Program Pre-Interview Communication" dated Apr. 19, 2016, 4 pages.

U.S. Appl. No. 14/993,328 "Notice of Allowance" dated Jun. 16, 2016, 9 pages.

U.S. Appl. No. 14/590,714 "Preinterview First Office Action" dated Jul. 7, 2015, 5 pages.

U.S. Appl. No. 14/590,714 "First Action Interview Office Action Summary" dated Sep. 3, 2015, 10 pages.

U.S. Appl. No. 14/590,714 "Notice of Allowance" dated Oct. 30, 2015, 24 pages.

U.S. Appl. No. 14/590,714 "Preinterview First Office Action" dated Jul. 7, 2015, 4 pages.

U.S. Appl. No. 14/516,363 "Preinterview First Office Action" dated Jan. 5, 2015, 5 pages.

U.S. Appl. No. 14/516,363 "First Action Interview Summary" dated Jan. 26, 2015, 8 pages.

U.S. Appl. No. 14/516,363 "Notice of Allowance" dated Mar. 30, 2015, 21 pages.

U.S. Appl. No. 14/713,899 "Non-Final Office Action" dated May 26, 2016, 11 pages.

U.S. Appl. No. 14/713,899 "Notice of Allowance" dated Aug. 30, 2016, 10 pages.

U.S. Appl. No. 14/211,138 "Preinterview First Office Action" dated Aug. 29, 2014, 7 pages.

U.S. Appl. No. 14/211,138 "First Action Interview Office Action" dated Oct. 15, 2014, 7 pages.

U.S. Appl. No. 14/211,138 "Notice of Allowance" dated Mar. 4, 2015, 20 pages.

U.S. Appl. No. 14/713,899 "Preinterview First Office Action" dated Jan. 3, 2014, 7 pages.

U.S. Appl. No. 14/713,899 "First Action Interview Office Action" dated Mar. 5, 2014, 7 pages.

U.S. Appl. No. 14/713,899 "Notice of Allowance" dated Apr. 9, 2014, 26 pages.

U.S. Appl. No. 13/673,638 "Preinterview First Office Action" dated Feb. 14, 2013, 5 pages.

U.S. Appl. No. 13/673,638 "First Action Interview Office Action" dated May 14, 2013, 4 pages.

U.S. Appl. No. 13/673,638 "Notice of Allowance" dated Jun. 27, 2013, 14 pages.

U.S. Appl. No. 15/071,339 "Preinterview First Office Action" dated Aug. 11, 2016, 5 pages.

U.S. Appl. No. 15/071,339 "First Action Interview Office Action" dated Sep. 28, 2016, 6 pages.

U.S. Appl. No. 15/071,339 "Notice of Allowance" dated Dec. 2, 2016, 23 pages.

U.S. Appl. No. 14/848,119 "Preinterview First Office Action" dated Feb. 2, 2016, 7 pages.

U.S. Appl. No. 14/848,119 "First Action Interview Office Action" dated Mar. 3, 2016, 9 pages.

U.S. Appl. No. 14/848,119 "Notice of Allowance" dated May 24, 2016, 26 pages.

U.S. Appl. No. 15/201,281 "Preinterview First Office Action" dated Dec. 2, 2016, 6 pages.

(56) References Cited

OTHER PUBLICATIONS

U.S. Appl. No. 15/201,281 "First Action Interview Office Action" dated Feb. 1, 2017, 6 pages.
U.S. Appl. No. 15/201,281 "Final Office Action" dated Aug. 28, 2017, 34 pages.
U.S. Appl. No. 15/201,281 filed Jul. 1, 2016, Non-Final Rejection dated Jun. 29, 2018, 46 pages.

* cited by examiner

CHRONICLE #59384029

I. Applicant-Provided Information:

Name of Applicant: _Joe Smith_    Social Security Number: _555-55-5555_
Loan Number (Application Number if it didn't close): _1587409_
Date Received:    _May 17, 2012_
Received by: Branch Number _4_    Officer Number _3_    Employee Number: _17_
Loan Type: _Conventional_ (not FHA-insured, VA-guaranteed, or FSA/RHS)
Property Type: _1-4 family home_ (not manufactured or multi-family home)
Use of Proceeds:    _Home purchase_ (not home improvement or refinance)
Owner Occupancy: _Owner occupied, principal dwelling_
Pre-Approval (Home Purchase Only): _Pre-approval requested_
Loan Amount: _$450,000_    Property Purchase Price: _$615,000_
Ethnicity:    Applicant: _Hispanic_    Co-Applicant: N/A
Race: Applicant:    Co-Applicant: N/A
Sex:    Applicant _Male_    Co-Applicant: N/A
Gross Annual Income: _$120,000_
Property Location: _555 E 16th Street, Denver, CO 55555_
Requested Loan Term: _30 years_    Requested Loan Type: _Fixed Interest Rate_

II. Third-Party-Provided Information:

Credit Scores: 731, 683, 656
Appraised Property Value: $604,000
Other Outstanding Debt: $63,000

III. Internal Calculation Variables:

Potential Interest Rate: 4.5%
Potential Monthly Mortgage Payment: $2280    Debt-to-Income Ratio: 22.8%
Potential Monthly Total Debt Payment: $2870    Total Debt-to-Income Ratio: 28.7%
Down-Payment Percentage: 28.4%
Total Loan Score: 64
Suggested Action: Approve
Action taken: (1) ☐ Loan originated  (2) ☐ Approved, not accepted  (3) ☐ Denied
(4) ☐ Withdrawn  (5) ☐ File closed for incompleteness  (6) ☐ Loan purchased by our institution  (7) ☐ Pre-approval request denied  (8) ☐ Pre-approval request approved but not accepted (optional reporting)
Date action taken:    If denied, reason

FIG. 7D

SYSTEM FOR PERIODICALLY UPDATING BACKINGS FOR RESOURCE REQUESTS

CROSS-REFERENCES TO RELATED APPLICATIONS

This application is a continuation-in-part of U.S. application Ser. No. 15/289,440, filed on Oct. 10, 2016, which is continuation-in-part of U.S. application Ser. No. 14/993,328, filed on Jan. 12, 2016, now granted U.S. Pat. No. 9,471,665 on Oct. 18, 2016, which claims the benefit of and priority to U.S. Provisional Application No. 62/102,196, filed on Jan. 12, 2015, and is a continuation-in-part of U.S. application Ser. No. 14/590,714, filed on Jan. 6, 2015, now granted U.S. Pat. No. 9,268,819 on Feb. 23, 2016, which is a continuation of U.S. application Ser. No. 14/516,363, filed on Oct. 16, 2014, now granted U.S. Pat. No. 9,098,875 on Aug. 4, 2015, which claims the benefit of and priority to U.S. Provisional Application No. 62/032,239, filed on Aug. 1, 2014. Application Ser. No. 15/289,440, filed on Oct. 10, 2016, is also a continuation-in-part of U.S. application Ser. No. 14/713,899, filed on May 15, 2015, now granted U.S. Pat. No. 9,530,164 on Dec. 27, 2016, which is a continuation of U.S. application Ser. No. 14/211,138, filed on Mar. 14, 2014, now granted U.S. Pat. No. 9,082,151 on Jul. 14, 2015, which claims the benefit of and priority to U.S. Provisional Application No. 61/792,011, filed on Mar. 15, 2013, and is a continuation-in-part of U.S. application Ser. No. 14/021,344, filed on Sep. 9, 2013, now granted U.S. Pat. No. 8,762,376 on Jun. 24, 2014, which is a continuation of U.S. application Ser. No. 13/673,638, filed on Nov. 9, 2012, now granted U.S. Pat. No. 8,572,083 on Oct. 29, 2013, which claims the benefit of and priority to U.S. Provisional Application No. 61/714,647, filed on Oct. 16, 2012, U.S. Provisional Application No. 61/652,970, filed on May 30, 2012, and U.S. Provisional Application No. 61/652,977, filed on May 30, 2012. Each of these applications are hereby incorporated by reference in their entireties for all purposes.

This application is also a continuation-in-part of U.S. application Ser. No. 15/017,339, filed on Feb. 5, 2016, now granted U.S. Pat. No. 9,619,840 on Apr. 11, 2017, which is a continuation-in-part of U.S. application Ser. No. 14/848,119, filed on Sep. 8, 2015, now granted U.S. Pat. No. 9,418,116 on Aug. 16, 2016, which claims the benefit of and priority to U.S. Provisional Application No. 62/047,474, filed on Sep. 8, 2014. Each of these applications are hereby incorporated by reference in their entireties for all purposes.

This application is also a continuation-in-part of U.S. application Ser. No. 15/201,281, filed on Jul. 1, 2016, which claims the benefit of and priority to U.S. Provisional Application No. 62/187,487, filed on Jul. 1, 2015. Each of these applications are hereby incorporated by reference in their entireties for all purposes.

FIELD

Techniques described herein relate to integrating processes of resource requests and subsequent automatic approval of those requests. More specifically, data related to resource requests is evaluated to determine an automated approval.

BACKGROUND

Processing resource requests can involve processing a large quantity of data to determine if a resource request can be approved. Furthermore, identifying and processing resource request data is complicated by diverse and incomplete data provided by the resource requester. Approval is inhibited when the diverse data set is incomplete. Approving a resource request is further inhibited by the myriad of complicated rules relating to specific resources types.

SUMMARY

A first embodiment of the invention is a system for automatically processing content objects and bucket metadata to facilitate responding to resource requests. The system comprises a chronical processor configured to: receive a resource request; associate the resource request with a chronicle; identify a set of content objects for the chronicle to be used in processing the resource request; and generate a set of buckets, wherein a bucket of the set of buckets is generated for each content object of the set of content objects, the bucket being configured to receive the content object. Each bucket in the set of buckets is configured to: receive a content object; associate the content object with the bucket; and generate metadata for the bucket to indicate that a status of the bucket reflects that the bucket is populated with a content object. The chronicle processor is further configured to: transform the metadata for each bucket in the set of buckets into an advancement score; determine, by comparing the advancement score with a predetermined threshold, a decision, wherein the decision is to advance the resource request; in response to the decision, process, in a batch, the set of content objects to produce a chronicle score and a suggested action; populate a chronicle overview with the chronicle score and the suggested action; and transmit an alert communication to an agent device, the alert communication facilitating providing access to the chronicle overview from the agent device. In a variation of the first embodiment the chronicle processor is further configured to, in response to the decision, transmit a state alert to the agent device facilitating providing access to the advancement score from the agent device. In yet another variation of the first embodiment is the system wherein the set of buckets has a predetermined number of buckets and the predetermined number of buckets is equal to the predetermined threshold. And in another variation of the first embodiment is the system wherein the suggested action is approval of the resource request. A further variation of the first embodiment is the system wherein the suggested action is to request a specific content object. A further variation of the first embodiment is the system wherein each content object in the set of content objects is locked such that it cannot be edited or deleted. And yet a further embodiment is the system wherein the chronicle overview includes the status of each bucket of the set of buckets.

A second embodiment of the invention is a computer processor implemented method for automatically processing content objects and bucket metadata to facilitate responding to resource requests. The method comprises: receiving a resource request; associate the resource request with a chronicle; identifying a set of content objects for the chronicle to be used in processing the resource request; and generating a set of buckets, wherein a bucket of the set of buckets is generated for each content object of the set of content objects, the bucket being configured to receive the content object. Each bucket in the set of buckets: receiving a content object; associate the content object with the bucket; and generating metadata for the bucket to indicate that a status of the bucket reflects that the bucket is populated with a content object. The method further comprising: transforming the metadata for each bucket in the set of buckets into an advancement score; determining, by comparing the advancement score with a predetermined threshold, a decision, wherein the decision is to advance the resource request; in response to the decision, processing, in a batch, the set of content objects to produce a chronicle score and a suggested action; populating a chronicle overview with the chronicle score and the suggested action; and transmitting an alert communication to an agent device, the alert communication facilitating providing access to the chronicle overview from the agent device. In a variation of the second embodiment, the method further comprises, in response to the decision, transmitting a state alert to the agent device facilitating providing access to the advancement score from the agent device. In yet another variation of the second embodiment is the method wherein the set of buckets has a predetermined number of buckets and the predetermined number of buckets is equal to the predetermined threshold. And in another variation of the second embodiment is the method wherein the suggested action is approval of the resource request. A further variation of the second embodiment is the method wherein the suggested action is to request a specific content object. A further variation of the second embodiment is the method wherein each content object in the set of content objects is locked such that it cannot be edited or deleted. And yet a further embodiment is the method wherein the chronicle overview includes the status of each bucket of the set of buckets.

A third embodiment of the invention is a non-transitory computer-readable medium having sets of instructions stored thereon for automatically processing content objects and bucket metadata to facilitate responding to resource requests, which, when executed by a computer, cause the computer to: receive a resource request; associate the resource request with a chronicle; identify a set of content objects for the chronicle to be used in processing the resource request; and generate a set of buckets, wherein a bucket of the set of buckets is generated for each content object of the set of content objects, the bucket being configured to receive the content object. For each bucket in the set of buckets the instructions cause the computer to: receive a content object; associate the content object with the bucket; and generate metadata for the bucket to indicate that a status of the bucket reflects that the bucket is populated with a content object. Instructions further cause the computer to: transform the metadata for each bucket in the set of buckets into an advancement score; determine, by comparing the advancement score with a predetermined threshold, a decision, wherein the decision is to advance the resource request; in response to the decision, process, in a batch, the set of content objects to produce a chronicle score and a suggested action; populate a chronicle overview with the chronicle score and the suggested action; and transmit an alert communication to an agent device, the alert communication facilitating providing access to the chronicle overview from the agent device. In a variation of the third embodiment the non-transitory computer-readable medium having sets of instruction stored thereon cause the computer to, in response to the decision, transmit a state alert to the agent device facilitating providing access to the advancement score from the agent device. In yet another variation of the third embodiment is the non-transitory computer-readable medium having sets of instruction stored thereon wherein the set of buckets has a predetermined number of buckets and the predetermined number of buckets is equal to the predetermined threshold. And in another variation of the third embodiment is the non-transitory computer-readable medium having sets of instruction stored thereon wherein the suggested action is approval of the resource request. A further variation of the third embodiment is the non-transitory computer-readable medium having sets of instruction stored thereon wherein the suggested action is to request a specific content object. A further variation of the third embodiment is the non-transitory computer-readable medium having sets of instruction stored thereon wherein each content object in the set of content objects is locked such that it cannot be edited or deleted. And yet a further embodiment is the non-transitory computer-readable medium having sets of instruction stored thereon wherein the chronicle overview includes the status of each bucket of the set of buckets.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

The present disclosure is described in conjunction with the appended figures:

FIG. 7D, shows an example of an overview of a generated chronicle;

In the appended figures, similar backings and/or features may have the same reference label. Where the reference label is used in the specification, the description is applicable to any one of the similar backings having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
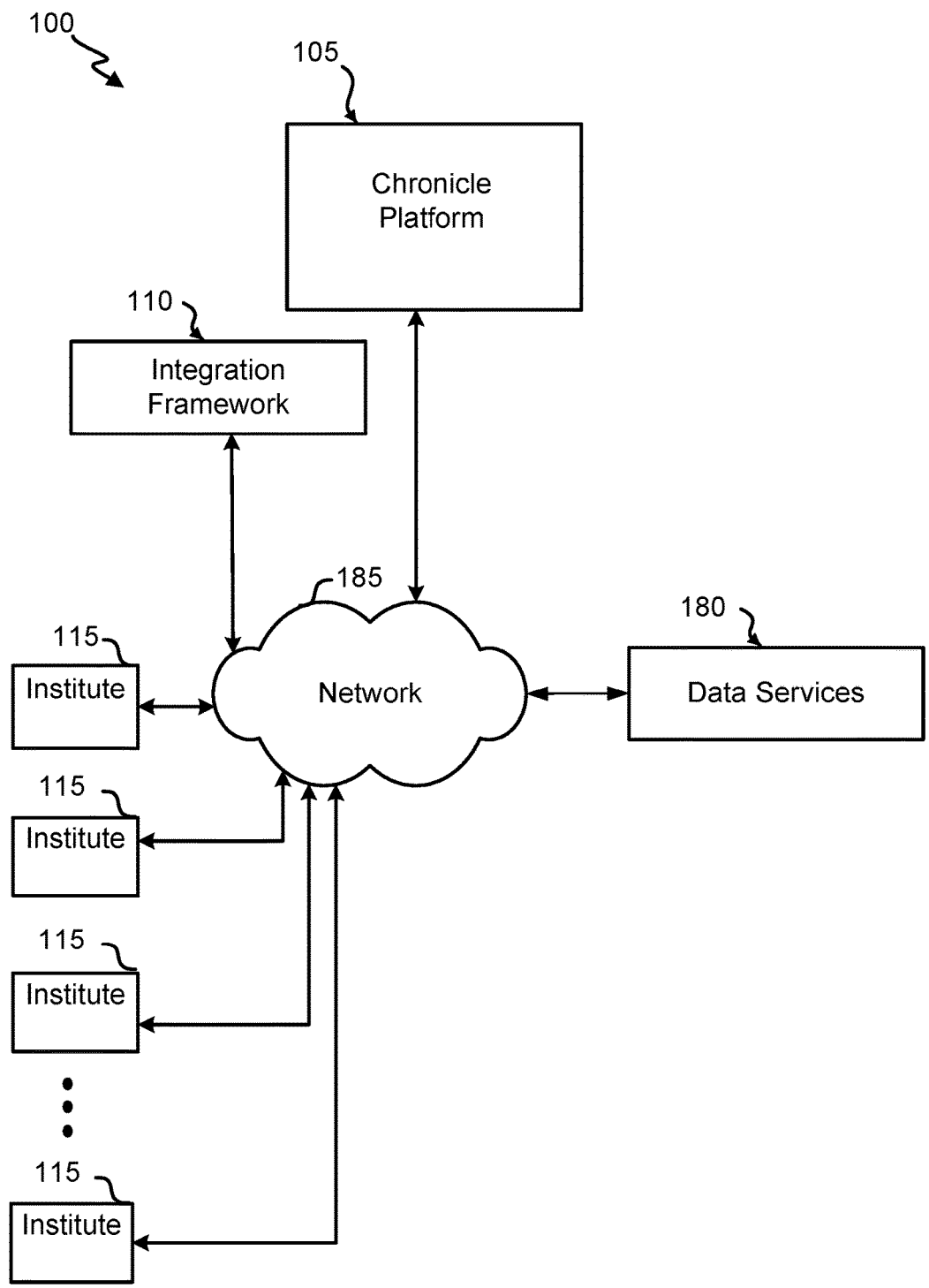
FIG. 1 depicts a block diagram of an embodiment of a chronicle system.

FIG. 1 depicts a block diagram of an embodiment of a chronicle system 100. This embodiment of the chronicle system 100 is built on a multitenant platform such as the Salesforce™ Force.com platform. The multitenant platform is used to provide services from one tenant to multiple unrelated tenants. Each institute 115 (banks, credit unions, etc.) is at least one tenant on the multitenant platform and each tenant uses services on the multitenant platform. A chronicle platform 105 and an integration framework 110 are each tenants on the multitenant platform that provide services to other tenants. An advantage of a multitenant platform is that it is unnecessary for tenants in the multitenant platform to be co-located and, as such, tenants can be separated geographically in some cases but share a geographic location in other cases. Another advantage of using a multitenant platform is that each of the institutes 115 tenants on the multitenant platform use the chronicle platform 105 and/or the integration framework 110 over a network 185 (a network is a system of computers and peripherals that are linked together and can consist of as few as two computing devices connected or millions of computers over a large geographical area with or without wires—such as the internet or the cellular telephone network) such that it is unnecessary for each of the institutes 115 to host their own chronicle platform 105 or integration framework 110. In other embodiments of the chronicle system 100, at least one of the institutes 115 host the chronicle system 100 and/or provide portals to the chronicle system 100.

The institutes 115 use the integration framework 110 and the chronicle platform 105 to perform, for example, chronicle processing, access management, status monitoring, version generation, backing processing, data aggregation, and report generation. The institutes 115 are entities that fulfill a resource request. The institutes 115 use a resource memorandum in completed form to grant or deny the resource request. The resource memorandum describes, among other things, a qualification profile of a resource requestor.

The chronicle platform 105 builds and updates the resource memorandum while it is processing the resource request. For instance, in some cases the chronicle platform 105 generates the resource memorandum that indicates the resource requester is not qualified for the requested resource. In that case the institute 115 can deny the resource request or take alternative action. Initially the chronicle platform 105 assigns each resource request a resource request identifier and the resource memorandum is associated with the resource request by the resource request identifier. The chronicle platform 105 also initially assigns a version identifier to the resource memorandum in order to trace subsequent versions of the resource memorandum that the chronicle system 100 uses while it processes the resource request. While the chronicle platform 105 retains the same resource request identifier while processing the resource request, the resource memorandum will evolve through many versions during the same process and each time the chronicle platform captures the version of the resource memorandum, it will assign a new version identifier to the loan memorandum when it is captured. Accordingly, when the chronicle platform is processing the resource request it creates a traceable history of versions of the resource memorandum that the institutes 115 various agents can audit.

The network 185 connects each of the institutes 115 with the integration framework 110, the chronicle platform 105, and one or more data services 180. The network 185 can include, for example, the Internet, an intranet, a secure network, a virtual private network, a local area network, a wide area network, or a wireless network. A network is a system of computers and peripherals that are linked together and can consist of as few as two computing devices connected or millions of computers over a large geographical area with or without wires—such as the Internet or the cellular telephone network. The network 185, for example, uses encrypted communications to securely transmit data in some embodiments. The network 185 can connect each of one or more institutes 115 with the integration framework 110, the chronicle platform 105, and one or more data services 180 using standard or custom APIs in some embodiments or with any other method or protocol to communicate over a network.

The data services 180 send service data to the institutions 115 and/or the integration framework 110 on the network 185 through to the chronicle platform 105. The chronicle platform 105 uses the service data to, for example, process chronicles, capture resource memorandum versions, aggregate data, and generate reports that the institutes 115 use to grant or deny resource requests. In one instance, the chronicle platform 105 detects, for each chronicle, which content buckets associated with the chronicle have been filled with a corresponding content objects. The detection can include, for example, identifying particular content buckets based on a request type and checking a status of each of the particular content buckets in correspondence with resource request identifier.

The data services 180 include any number of third party services providing data to the chronicle system 100 including a pricing service, an extension service, a geography service, a tax service, an appraisal service, an identification service, a watchdog service, a background service, a benchmarking service, and a document service. The data services 180 send the service data to integration framework 110. The data services 180 retrieve data from a number of reporting services. For example, the pricing service retrieves data from sources including PrecisionLending™, and the extension service retrieves data from reporting services including CBC Innovis™ and Dunn and Bradstreet™. The geography service retrieves data from reporting services that include FEMA's Flood Map Services Center. The tax service retrieves tax data from reporting services, including, for example, city, county, state, and federal taxing authorities. And the appraisal service retrieves data from reporting services, including, for example, city, county and state appraisal agencies and Kelly Blue Book™. The identification service uses reports from services like Moody's™, Westlaw™, and LexisNexis™ are included in the reporting services that provide data to the watchdog service. One of the sources used by the background service is Equifax Business Connect™. The benchmarking service obtains reports from, for example Reuters™ RNA. The document service uses FIS FLO™ and LaserPro™ providers, among others. The integration framework 110 passes data from data services 180 to the chronicle platform 105 after it has transformed the data.

The integration framework 110 is also a tenant on the multitenant platform. The integration framework 110 receives data and requests in any variety of data formats from one or more sources including the institutes 115, the chronicle platform 105, and the data services 180. In some cases the institutes 115, the data services 180, and the chronicle platform 105 push data and/or requests to the integration framework 110. The integration framework 110 fulfills the request, transforms the data, and sends the data to the correct target. For example: the chronicle platform 105 sends a request for an extension report to the integration framework 110; the integrations framework 110 retrieves the report from the extension service 135; transforms it to a format compatible with the chronicle platform 105, and sends the result to the chronicle platform 105. The integration framework 110 receives data in real-time, in batches, or as updated data. The integration framework 110 uses servers and databases to transform the data from a source to a format compatible with the target it is intended for; and sends it to that target. For instance, when the chronicle platform 105 generates an updated resource memoranda for the institutes 115, it sends the updated resource memorandum to the integration framework 110, and then the integration framework 110 transforms the updated resource memorandum to a format expected by institutes 115, and sends it to institutes 115. The integration framework 110 receives and transforms data from other tenants on the multitenant platform concurrently in some cases or sequentially in others. The integration framework 110 is a first interface between both the institutes 115 and the data services 180 and the chronicle platform 105.

The chronicle platform 105 communicates with the institutes 115 and the integration platform 110 using the network 185. The chronicle platform 105 receives content objects from the institutes 115 and the integration framework 105. The chronicle platform 105 creates chronicles and populates the chronicles with the content objects (e.g., received from, or generated based on data received from, a user device, institute agent device, etc.). Each chronicle can pertain to one request, and the chronicle can include associated content objects and/or indications that one or more content objects of particular types have not been received. The chronicle can further include a status of each of one or more content object and/or the chronicle as a whole, which may relate to a level of completion and/or assessment.

The chronicle platform 105 processes the populated chronicles to update the resource memorandum and to generate reports and documents that the institutes 115 use to grant or deny the resource request. The chronicle platform 105 captures versions of the resource memorandum and creates a resource request processing history that the institutes 115 agents use for auditing purposes. The chronicle platform 105 generates the presentation and the resource memorandum for the institutions 115 in some cases in a web page format or as an API and in other cases in standard or custom document formats, such as Word™. The chronicle platform 105 also aggregates data from multiple tenants and generates corresponding reports for the institutes 115. The chronicle platform 105 also uses the aggregated data to process chronicles. The chronicle platform 105 serves institutes 115 concurrently in some cases or sequentially in other cases.

Figure 2A:
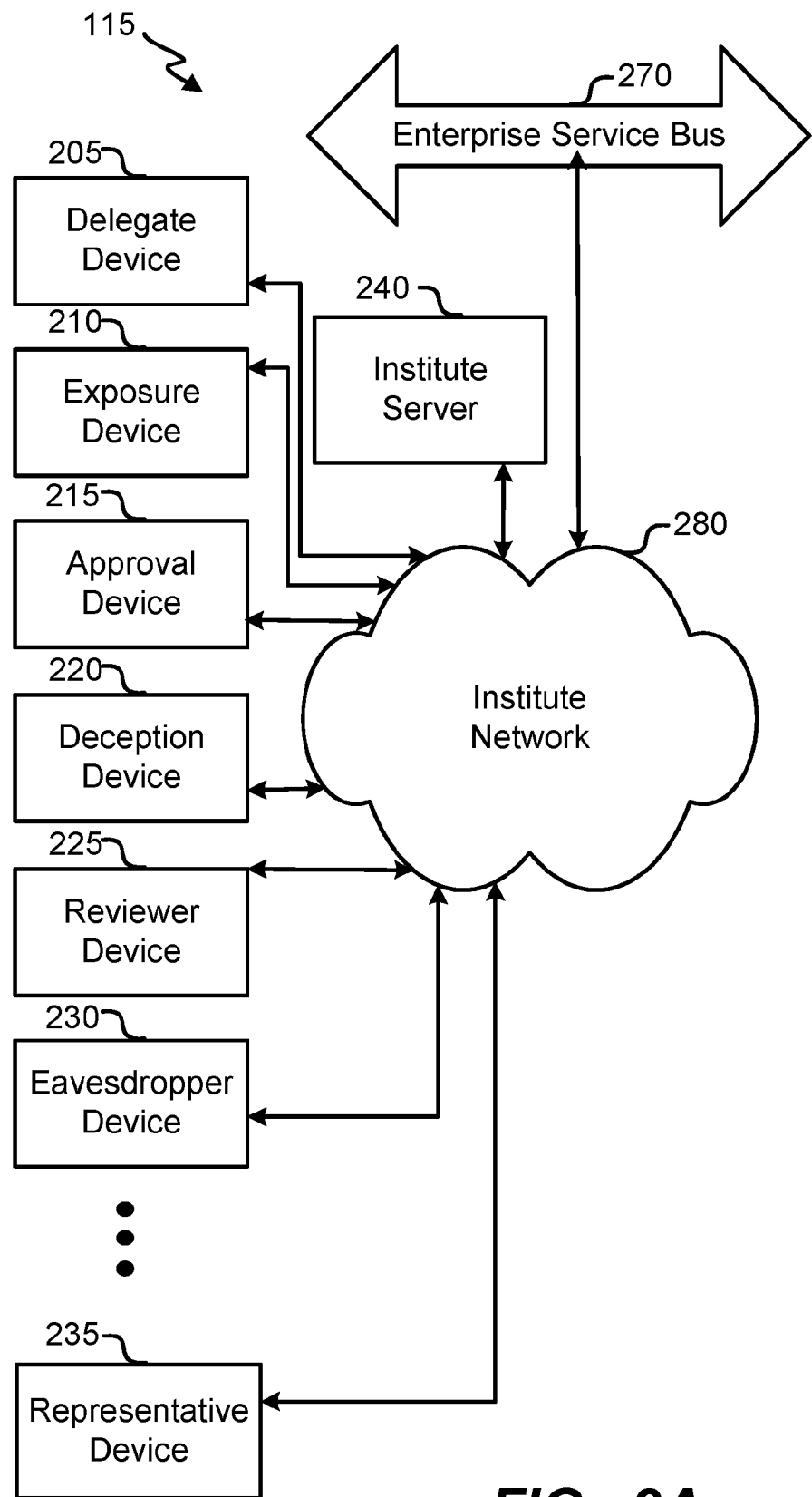
FIG. 2A depicts block diagrams of an institute.

FIG. 2A depicts a block diagram of an embodiment of an institute 115. The institute 115 are entities that grant or deny end-user resource requests such as for home mortgages. The institute 115 access the chronicle platform 105 to obtain, for example, chronicle processing, resource memorandum updating, version capture, backing processing, data aggregation, and report generation. The institute 115 internal agents include: a delegate agent using a delegate device 205; an approval agent using approval device 215; a deception agent using a deception device 220; a reviewer agent using a reviewer device 225; an eavesdropper agent using an eavesdropper device 230; a exposure agents using a exposure device 210; and a representative using a representative device 235. Although this block diagram of an embodiment of institute 115 shows only the single delegate device 205, the single approval device 215, the single deception device 220, the single reviewer device 210, the single representative device 235, the single end-user device 250, the single watchdog device 255, and the single eavesdrop device 260, in other embodiments the institute 115 include multiple devices in each instance that correspond to multiple agents. The devices comprise all manner of computing apparatus such as general purpose computers, mainframe computers, terminals connected to servers, desktop computers, notebook computers, tablet computers, pad computers, and smart phones. The institute 115 internal and third-party agents use devices that are connected by an institute network 280 to an institute server 240. The institute server 240 may also be connected to an enterprise service bus 270 and the data services 180 by the institute network 280.

The delegate agent is the loan officer in some cases and communicates with the end-user agent that initiated the resource request directly in some cases, for example, in-person or by telephone. The delegate agent requests data and documents from the end-user agent that are necessary to determine whether the end-user is qualified for the resource request. Alternatively the delegate device 205 communicates with the end-user device 250 over the institute network 280 via email, text, facsimile, or any other method of electronic communication. In most cases the chronicle platform 105 will trigger a version capture event when the delegate device 205 collects data from the end-user device 250. The delegate device 205 collects end-user agent data relevant to qualifying the end-user agent for the resource request and sends it to the enterprise service bus 270 or the institute server 240. The delegate device 205 makes requests for and accesses reports and documents that the chronicle platform 105 generates such as the resource memorandum. The delegate device 205 communicates over the institute network 280 with other internal devices including the exposure devices 210, the approval device 215, the deception device 220, the reviewer device 225, the eavesdropper device 230 and the representative device 235 over the institute network 280.

The exposure agent 210 evaluates risk associated with the institutes' 115 granting or denying a resource request. The exposure device 210 makes requests for and accesses reports and documents including the resource memorandum that the chronicle platform 105 generates. The exposure device 210 also requests additional data from the end-user device 250 in some cases when the chronicle platform 105 generates a report that indicates the end-user agent is associated with a high exposure that might be mitigated by additional end-user agent data. The exposure device 210 communicates with other internal devices such as the delegate device 205, the approval device 215, and the eavesdropper device 230 over the institute network 280. The approval agent approves the institutes 115 decision to grant or deny the end-user agent's resource request. The approval device 215 makes requests for and accesses reports and documents that the chronicle platform 105 generates, such as updated resource memorandum. The approval device 215 communicates with the reviewer device 225 over the institute network 280. The reviewer agent reviews institutes 115 decisions granting or denying end-user agent requests using the reviewer device 215 to access reports such as the resource memorandum that the chronicle platform 105 generates. The reviewer device 215 communicates with other internal devices such as the eavesdropper device 230 over the institute network 280.

The eavesdropper agent audits transactions related to resource requests. The eavesdropper device 230 makes requests for and accesses reports and documents including the resource memorandum that the chronicle platform 205 generates. For instance, the eavesdropper device 230 audits the resource memorandum capture history associated with the resource request. The eavesdropper device in some cases communicates with the watchdog device 255 and the eavesdrop device 260 over the institute network 280. The eavesdropper device 230 communicates with all other internal devices over the institute network 280, including the deception device 220. The deception agent monitors transactions related to resource requests for fraudulent activity including an end-user inaccurately reporting revenue. The deception device 220 also makes requests for and accesses reports and documents, including the resource memorandum generated by the chronicle platform 105. The deception device 220 in some cases communicates with the watchdog device 255 and the eavesdrop device 260 over the institute network 280. The deception device 220 communicates with all other internal devices such as the representative device 235 over the institute network 280. The representative agent 235 works in the institutes 115 front offices to conduct in-person end-user transactions. The representative device 235 can access reports and documents including resource memorandum generated by the chronicle platform 105 over the institute network 280.

The institute network 280 connects the internal devices, the third-party devices, the institute server 240, the data services 180 and the enterprise service bus 270. The institute network 280 can include, for example, the Internet, an intranet, a secure network, a virtual private network, a local area network, a wide area network, or a wireless network. The institute network 280, for example, in some embodiment uses encrypted communications to securely transmit data. The institute network 280 also connects using standard or custom APIs (an "application program interface" is a set of routines, protocols, and tools for building software applications that specify how software backings should interact) in some embodiments. In most embodiments the institute network 280 will include a firewall to protect the institutes 115 from security access breaches. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied.

The institute server 240 is a computing device connected to all internal and third-party devices, the data services 180, and the enterprise service bus 270 by the institute network 280. A server is an instance of a computer program that accepts and responds to requests made by another program typically called a client. Any device that runs server software can generally be considered a server. Servers are also typically used to manage and control a network's resources. Servers may be set up to control access to a network, send/receive e-mail, manage print jobs, or host a website. Some servers are committed to specific task; and then are referred to as dedicated. Servers are commonly used to deliver services that are required constantly, most servers are never turned off. The institute server 240 manages, stores, sends, receives, and processes data for the institutes 115. For example, the institute server 240 can provide institutes 115 with around-the-clock file and network security, centralized data storage and shared resources, virus management and centralized back up processes. In addition, the institute 240 server can control access to the institute network 280 and other internal process and manages all user credentials. The institute server 240 also can provide the authentication interface to mobile and third-party devices using the Internet or other external network from outside of the institute network 280 firewall. Additionally, the institute server 240 can provide increased reliability so that there are no interruptions in the institute 115 workflow processes such as the resource request process The institute server 240 maintains a local database and performs all internal processes for the institute 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institute 115 by designating an authorization for each file such that only authorized agents can gain access to that file. For instance, the institute server 240 will not allow an eavesdrop agent access to the institute 115 employee personal information. The institute server 240 also provides the institute 115 with critical virus protection services to protect the institute 115 from a virus that a third-party device might introduce. The institute server 240 also provides the authentication interface to mobile devices using the Internet, or any other network, outside of the institute network 280 firewall.

Some institutes may further comprise an enterprise service bus 270. An enterprise service bus, or ESB, is fundamentally an architecture. It is a set of rules and principles for integrating numerous applications together over a bus type infrastructure. The enterprise service bus 270 is a second interface between both the institutes 115 and the data services 180 and the chronicle platform 105. The enterprise service bus 270 receives data in any variety of data formats from one or more sources including the data services 180. In some cases data services 180 push data to the enterprise service bus 270. Conversely, in other cases the enterprise service bus 270 pulls data from the data services 180. The enterprise service bus 270 receives data in real-time, in batches, or as updated data. The enterprise service bus 270 sends data to the chronicle platform in a predefined format acceptable by a data interface 365 and a user interface 320. The enterprise service bus 270 uses servers and databases to transform the data into other formats compatible with the chronicle platform 105. The enterprise service bus 270 sends the transformed date to the chronicle platform 105. The enterprise service bus 270 also transforms the date from the chronicle platform into the proper format for institutes 115. The enterprise service bus 270 also transforms data transmitted and received to and from the data services 180 into compatible formats as required. The enterprise service bus 270 distributes information across the institutes 115 quickly and easily, masks the hardware and networking differences among the devices using institutes 115, and integrates legacy processes and data to current workflows.

Figure 2B:
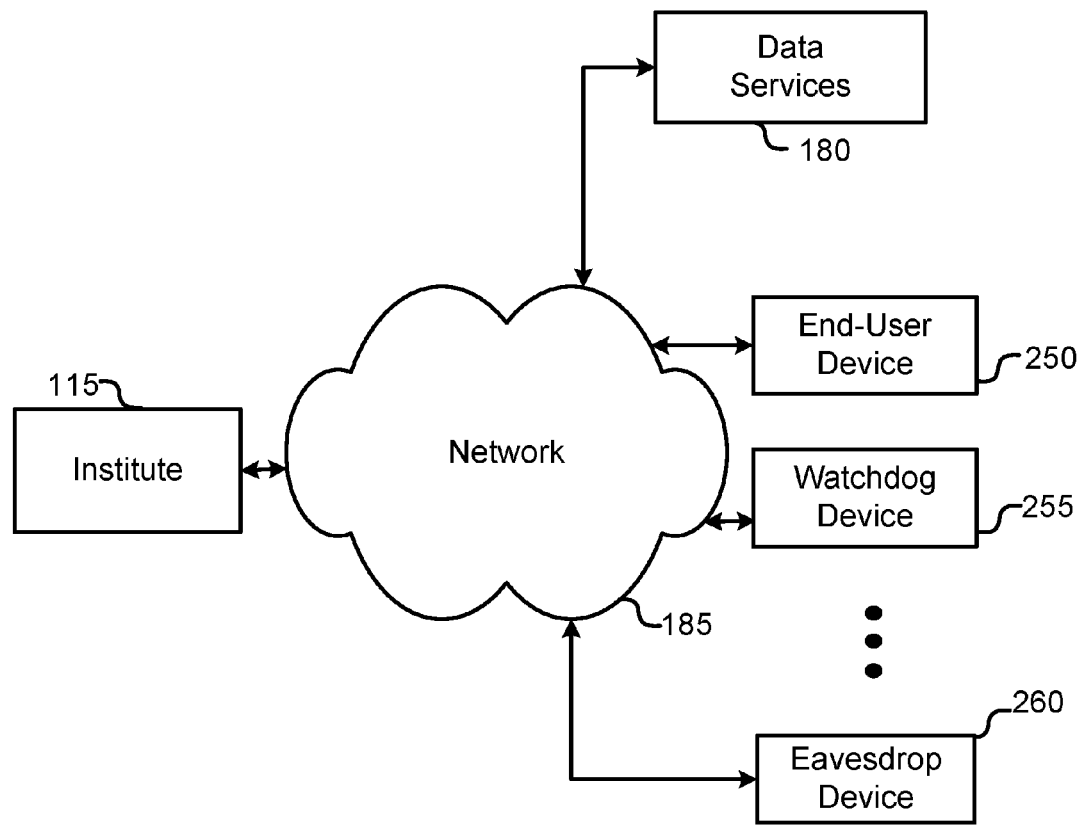
FIG. 2B depicts a block diagram of institutes communicating with other devices.

FIG. 2B depicts the institutes 115 (e.g., that includes an enterprise service bus, such as the enterprise service bus 270) in communication with data services 180, end user device 250, watchdog device 255 and eavesdrop device 260 over the network 185. An end-user agent is the resource requester. The end-user agent can be, for example, an individual or company requesting a home, personal, business or equipment loan or a treasury service. The end-user agent communicates directly with the delegate agent, for instance in person or by telephone. The end-user agent electronically communicates with institutes 115 using the end-user device 250 and sends content objects related to the resource request to delegate device 205 or the institute server 240. The end-user device 250 accesses reports and documents that the chronicle platform 105 generates over the network 185. The watchdog agent monitors transactions related to resource requests for regulatory violations. The watchdog device 255 accesses reports and documents generated by the chronicle platform 105 over the network 185. The eavesdrop agent eavesdrops transactions related to resource requests including the resource memorandum capture history. The eavesdrop device 260 accesses reports and documents including the resource memorandum generated by the chronicle platform 105.

Figure 2C:
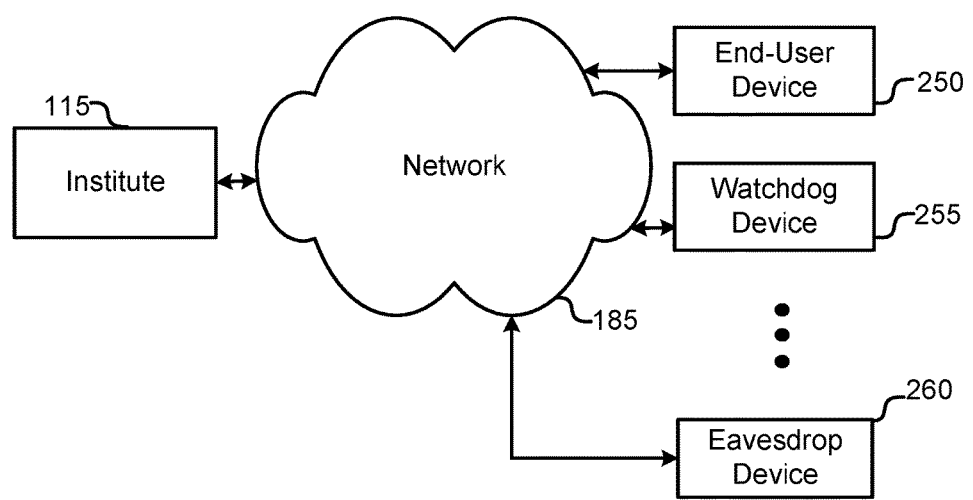
FIG. 2C depicts a block diagram of institutes communicating with other devices.

FIG. 2C depicts the institutes 115 (that need not include an enterprise service bus) that is not in direct communication with data services 180, as is shown in FIG. 2B, in communication with end user device 250, watchdog device 255 and eavesdrop device 260 over the network 185. In this embodiment, the integration framework 110 performs the data format transformations for institute 115 as well as interfaces with data services 180 for institutes 115.

Figure 3:
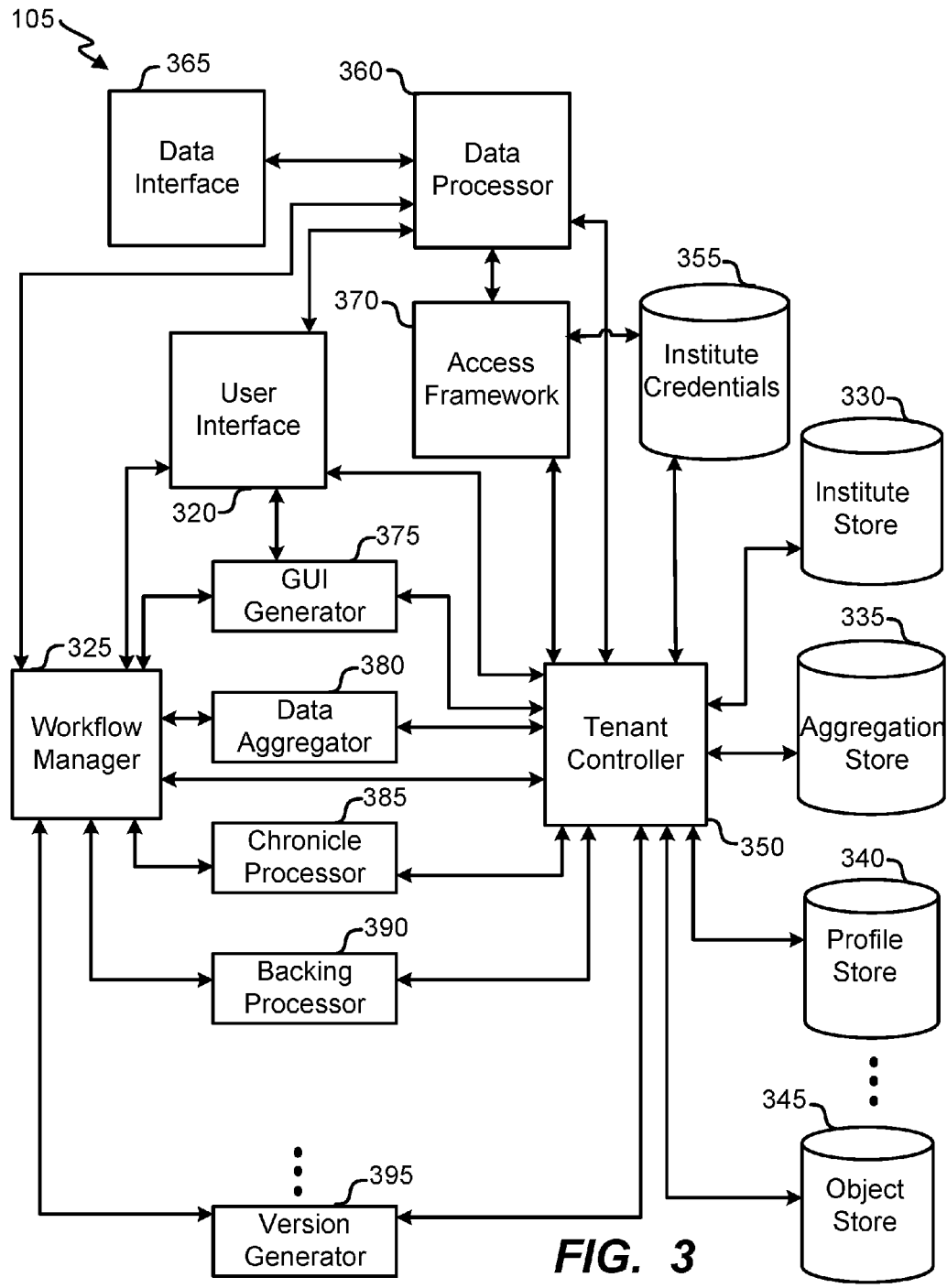
FIG. 3 depicts a block diagram of an embodiment of a chronicle platform.

FIG. 3 depicts the block diagram of an embodiment of the chronicle platform 105. The chronicle platform 105 is a tenant on the multitenant platform that the chronicle system 100 is built on. The chronicle platform 105 is the tenant that provides chronicle system 100 services to other tenants on the platform, specifically the institutes 115 tenants. The chronicle platform 105 communicates directly with the integration framework 110 and the institutes 115 through the data interface 365 and the user interface 320 over the network 185. The data interface 365 communicates using TCP/IP (transmission control protocol/internet protocol) with the integration framework 205 over the network 185. The data interface 365 uses HTTP(s) requests and responses. The data interface 365 transmits and receives data in JSON and XML formats embedded in the HTTP(s) requests and responses. For example, the data interface 365 uses the Salesforce™ Bulk API and makes an HTTP(S) request for large data files from institutes 115 and then receives them with the data embedded in JSON or XML formats in an HTTP(s) response from the integration framework 110. In another example the data interface 365 sends HTTP(s) requests to document service 175 with resource request data embedded in XML format. The data interface 365 also uses HTTP(S) web service calls to request and receive data. For example, the data interface 365 sends HTTP(s) web service requests to retrieve data from pricing service 130, identification service 155, and extension service 135.

The user interface 320 receives and transmits requests and responses between the institute 115 devices and the chronicle platform 105 over the network 185 using the enterprise service bus 270 or the integration framework 110. The user interface 320 uses HTTP(s) web service connections in addition to JSON and XML formats embedded in the HTTP(s) requests and responses to communicate and send and receive data between the chronicle platform 105 over the network 185 and to the institute 115 devices by way of the integration platform 110 or the enterprise service bus 270. The user interface 320 transmits presentation data generated by the GUI generator 375 to the institute 115 devices using HTTP(s) web services. While described separately here, both the user interface 320 and the data interface 365 can be combined as a single interface or can be hosted on a single processor. In other embodiments the user interface 320 and the data interface 365 also use any form of network communication protocols not described here.

A data processor 360 filters the credential and permission information from incoming HTTP(s) requests and responses from data interface 365 and user interface 320 and sends them to an access framework 370 to determine if the requests and responses are from a verified source. The data processer 360 stops processing the HTTP(s) request or response if the access framework 370 does not verify the source. The data processor 360 extracts the embedded data from the response. The data processor 360 then sends the extracted data to a tenant controller 350 and transmits the filtered response to a workflow manager 325. For instance, when the chronicle platform 105 makes an HTTP(s) request for an extension report from the integration framework 110: the integration framework 110 returns an HTTP(s) response with the extension data requested embedded in the HTTP(s) response; the data processor 360 filters the HTTP(s) response and sends the credential and permission information to the access manager 370; the access manager verifies the source; the data processor 360 then extracts the extension data and sends it to the tenant controller 350; and the data processor 360 sends the filtered response to the workflow manager 325. When the workflow manager 325 is ready to send an HTTP(s) request or a response, it transmits instructions to the data processor 360. The data processor 360 interprets the instructions from the workflow manager 325, retrieves data from the tenant controller 350 if so instructed, compiles the HTTP(s) request or response, and transmits the compiled HTTP(s) request or response to the data interface 365. For instance, when the workflow manager 325 determines that a loan memorandum is ready to be transmitted to institutes 115: workflow manager 325 sends instructions to the data processor 360 to retrieve the resource memorandum data from the tenant controller 350 along with general delivery instructions; the data processor 360 retrieves the resource memorandum data from the tenant controller 350 and complies the HTTP(s) response; and the data processor 360 transmits the compiled HTTP(s) response to the data interface 365. At the same time the workflow manager 325 sends instructions to the GUI generator 375 to create a presentation for the institutes 115 devices and instructs the data processor 360 to transmit that presentation to the user interface 320.

The workflow manager 325 manages the processes and interactions in the chronicle platform 105. The workflow manager 325 receives filtered requests and responses from the data processor 360 and parses and interprets them to determine which of the GUI generator 375, the data aggregator 380, the chronicle processor 385, the backing processor 390, and the version generator 395 processes to initiate and control in response to the requests and responses. The workflow manager 325 also receives triggers from the chronicle platform 105 itself that indicate an event has occurred that requires further processing. The workflow manager 325 then initiates the processes, manages the processes to the end, and controls and coordinates interactions among processes. For instance, when the institutes 115 request or a triggering event to capture the current version of the resource memorandum occurs, the workflow manager 325: instructs the tenant controller 350 to retrieve the correct data and send it to a version generator 395; starts the version generator 395; waits for the version generator 395 to capture the version; instructs the version generator 395 to send the result to the tenant controller 350; instructs the tenant controller 350 to retrieve data and send it to the chronicle processor 385; starts the chronicle processer 385; waits for the chronicle processor 385 to finish; instructs the chronicle processor to send the result to the tenant controller 350; instructs the tenant controller 350 to retrieve data and send it to a GUI processor 375; instructs the GUI processor to generate a browser viewable form of the captured resource memorandum; waits for the GUI processor 375 to finish; instructs the GUI processor 375 to send the result to the tenant controller 350; instructs the tenant controller 350 to retrieve data and send it to the data processor 360; and then instructs the data processor 360 to generate an HTTP(s) response that contains a presentation of the event that triggered the version generator 395 to capture the current versions of the resource memorandum. The workflow manager 325 identifies the workflow progression for any process on the chronicle platform 105. The workflow manager 325 initiates each of the GUI generator 375, the data aggregator 380, the chronicle processor 385, the backing processor 390, and the version generator 395 simultaneously or successively or both. For instance, the workflow manager 325 can initiate the version generator 395 to capture a version of the resource memorandum while concurrently initiating the GUI generator 375 to create a presentation to report on the event that triggered capturing the version of the resource memorandum. Conversely, if the workflow to respond to the event that triggered capturing the version of the resource memorandum also required that the chronicle platform 105 return a copy of the version of the resource request, in that case the workflow manager 325 would initiate the version generator 395 and the GUI generator 375 successively. A graphical user interface known here as a GUI, is a type of interface that allows users to interact with electronic devices through graphical icons and visual indicators such as secondary notation, as opposed to text-based interfaces, typed command labels or text navigation.

The access framework 370 controls access to the chronicle platform 105. The access framework 370 receives credentials and permissions from incoming HTTP(s) requests and responses; retrieves credentials and permissions from an institute credentials 355; and verifies that the credentials and permissions match or validates them in any number of ways. The access framework 370 also retrieves credentials permissions from the institute credentials 355 and sends them to the tenant controller 350 for the data processor 360 to embed them into the HTTP(s) requests and responses that the data interface 365 sends to the integration framework 110 or the institutes 115. The Hypertext Transfer Protocol (HTTP) is an application protocol for distributed, collaborative, hypermedia information systems. It is the foundation of data communication for the World Wide Web. Hypertext is structured text that uses logical links (hyperlinks) between nodes containing text.

The access framework 370 manages permissions based on inputs. For example, a user having requested a resource can specify permissions pertaining to the request. The permissions can indicate that one or more other users or agents are permitted to access select or all data pertaining to the request. Permissions may, but need not, be time-limited, which may include limiting access permission to (for example) a particular period of absolute time (e.g., date range) or a period of time with a beginning or end defined by a given event (e.g., detection of a content object or progression to a new state in a workflow). As one illustration, a requestor device may identify one or more agents via corresponding email addresses to indicate that each of the one or more agent is permitted to access data being collected and submitted for the request. Should any of these identifiers subsequently be received from a device as a form of identification, the access framework 370 may determine that data pertaining to the request (e.g., previously collected data, analysis of previously collected data and/or specifications of data that still is to be collected) can be transmitted to the device.

Permissions may, but need not, be tied to task delegation. In one instance, delegating a task pertaining to a request to a given agent has an effect of also granting access permission (e.g., to task-specific data and/or request-specific data) to the agent. The access permission may include (for example) a read-access and/or an access that permits uploading, data entry, and/or data editing. A task that is delegated may include, e.g., providing a particular type of content object or a particular type of data (e.g., corresponding to a given field).

The tenant controller 350 retrieves and stores data used by all of the processes on the chronicle platform 105. The tenant controller 350 is connected to all storage media and all processors on the chronicle platform. The workflow manager 325 instructs the tenant controller 350 when to retrieve data and where to send it. For instance, when the workflow manager 325 is ready to initiate the chronicle processor 385 to complete a workflow, it instructs the tenant controller 350 to retrieve all of the data required to process the workflow and to send it to the chronicle processor 385. The workflow manager 325 instructs the chronicle processor 385 to send the result to the tenant controller 350 when it has completed processing.

The institute credentials 355 stores institutes 115 credentials and permissions. An institute store 330 stores data specific to each of the institutes 115 and its end-users. The data may include, for example, agent-identifying information (e.g., email addresses), credentials of one or more agents, and/or associations between each of one or more agents and one or more requests.

An aggregator store 335 stores results from a data aggregator 380. A profile store 340 and an object store 345 store data local to the chronicle platform 105. Although depicted as separate storage in FIG. 3, the institute credentials 355, the institute store 330, the aggregator store 335, the profile store 340 and object store 345 are implemented in one or more storage devices in other embodiments.

The GUI generator 375 generates the graphical user interface presentations that the chronicle platform 105 sends through the integration framework 110 or the enterprise service bus 270 to the agent that sent an HTTP(s) request or response to the chronicle platform 105. The workflow manager 325 starts the GUI generator 375 after instructing the tenant controller 350 to retrieve and send data to the GUI generator 375. The institutes 115 may each have any number of graphical user interface format requirements. For instance the GUI generator 375 will generate different graphical user interfaces for a tablet than for a smart phone and yet another for a laptop computer. The workflow manager 325 passes the GUI generator 375 the necessary format instruction in some circumstances and in other circumstances the tenant controller 350 sends the format instruction.

The data aggregator 380 aggregates data from any number of sources that is relevant to processing the resource request. In one example the data aggregator 380 collects data (e.g., pertaining to multiple requests) from many tenants on the multitenant platform. The data aggregator 380 then strips all confidential and personal information from the data it receives from the many tenants so that all tenants can access the aggregated data. The data aggregator 380 groups like data and performs any number of statistical analyses on that data. For example, the data aggregator 380 computes the average annual income of every end-user resource requester for all tenants. The data aggregator 380 also aggregates entities and actions related to the resource request. For instance, the data aggregator 380 can aggregate all family members that own a property they are trying to mortgage. The data aggregator 380 can aggregate their annual income, their indebtedness, and other factors critical for the institutes 115 to qualify the resource request. The chronicle processor 390 uses the data aggregator 380 result to process chronicles and update the resource memorandum, in some cases.

The chronicle processor 390 manages interactions and information associated with the resource request. The chronicle processor 390 creates a chronicle for each resource request and populates the chronicle with content objects related to the resource request. The chronicle processor 390 manages all of the documents related to the resource request. The chronicle processor 390 tracks a status of document provision, such that—for a particular request—it can be determined (for example) which content objects have been received, completed, reviewed and/or finalized and/or which content objects still may be or must be received, completed, reviewed and/or finalized for full processing of the request. The chronicle processor 390 processes the content objects in the chronicle to generate and update the resource memorandum and other reports related to the resource request. For example, the chronicle processor 390 computes the spread of the interest rate used to fulfill a resource request. The chronicle processor 390 uses the content objects from the data services 180 to populate the chronicle with data used to qualify the resource request—for example—a resource request for a home loan, business loan, or vehicle loan.

The chronicle processor 390 creates a trigger that the workflow manager 325 detects and processes when predetermined events occur. For instance, when the chronicle processor 390 fills a chronicle with all of the content objects required to establish the qualification profile of the resource requester, the chronicle processor 390 creates the trigger that workflow manager 325 detects and then, once detected, initiates the workflow for capturing a version of the resource memorandum. As another example, the chronicle processor 390 creates a trigger that a delegated task has not been completed by a particular time. An alert may then be generated (e.g., to be presented via the GUI generator 375) or the task may automatically be re-delegated.

The workflow manger 325 also initiates the GUI generator 375 to generate a presentation for the institutes 115 agent to signify that the documents required to qualify the resource request are complete, and as such, the resource requester's qualification profile is ready for the institutes 115 agent to evaluate. The chronicle processor 390 is workflow driven by the workflow manager 325 that instructs the chronicle processor 390 how to progress through processing a chronicle based on any number of events occurring externally to the chronicle platform 105 as well as events occurring in the chronicle platform 105.

The resource memorandum is updated numerous times while chronicle system 100 is processing the resource request. For instance it is updated when extension service 135 sends a credit report or when the end-user device 250 uploads a paycheck stub or tax return. The version generator 395 captures versions of the resource memorandum at different points during the resource request processing that the eavesdropper device 230, the watchdog device 255, and the eavesdrop device 260 can audit. In some circumstances, the version generator 395 captures the version of the resource memorandum at the request of the institutes 115. As one example, a delegate device 205 makes a request to the chronicle platform 105 to capture the version of the resource memorandum before sending the resource memorandum to the reviewer device 225 for review. The version generator 395 also automatically captures the version of the resource memorandum based on triggering criteria generated by the workflow internal to the chronicle platform 105, and on such other triggers as the passage of time. For example, the workflow manager 325 detects the trigger sent by the chronicle processor 390 when it received the data from the credit report in the example above and initiates the version generator 395 to capture the version of the resource memorandum. The workflow manager 325 also instructs the version generator 395, to capture the version of the resource memorandum every 90 days. Once the version is captured the version generator 395 also creates a new version of the resource memorandum as dictated by instructions from the workflow manager 325, in some cases, and the new version of the resource memorandum becomes the active resource memorandum used by all parties to continue processing the resource request. According to the workflow instructions generated by the workflow manager 325, the version generator 395 forwards a copy of the captured version of the resource request for further processing, for instance, to the reviewer device 225. And if the instructions from the workflow manager so indicate, the version generator 395 forwards the new version of the resource memorandum to designated devices, such as the delegate device 205. After the version generator 395 captures the version of the resource memorandum it prevents further modification to the captured version in any number of ways. In some cases, the version generator 395 converts an editable document to one that is read-only—for instance the version generator 395 converts a Word document to a PDF document. The version generator 395 can also prevent further modification by write-protect protecting the captured version of the resource memorandum using any number of secure file storage processes and/or protocols either as s PDF file or any other, for instance, JSON or XML data corresponding to fields in the resource memorandum. In the case where the eavesdropper device 230 makes a request to audit the resource memorandum capture history, the chronicle platform 105 retrieves the resource memorandum capture history so that the eavesdropper device 230 can review it.

The backing processor 390 processes collateral related to the resource request. The backing processor 390 calculates for each piece of collateral such values as, for example, percent ownership, percent and length of indebtedness, relative relationship to the resource requester, and annual revenue or losses it generates.

Figure 4:
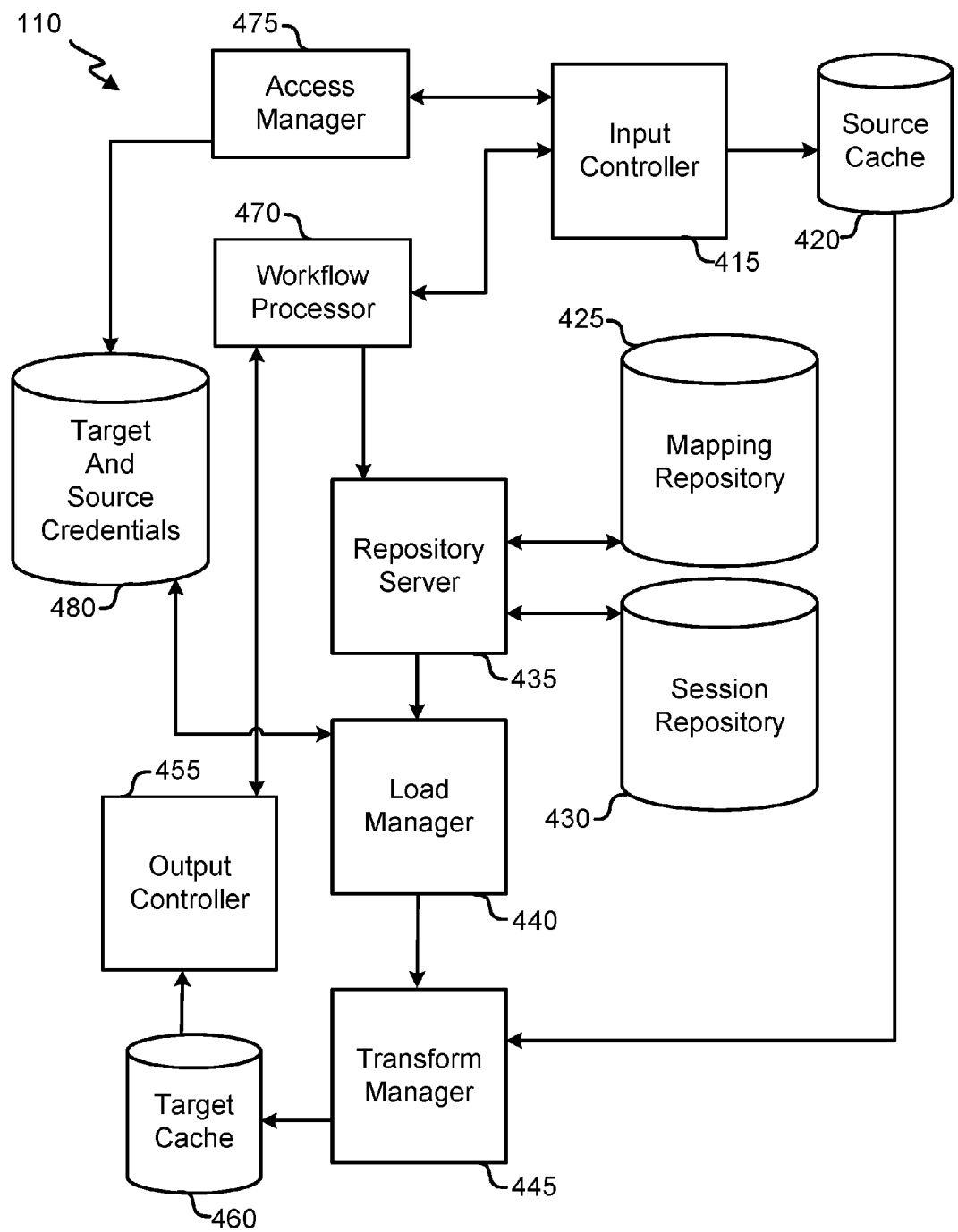
FIG. 4 depicts a block diagram of an embodiment of an integration framework.

FIG. 4 depicts the block diagram of an embodiment of the integration framework 110. The integration framework 110 is also a tenant on the multitenant platform the chronicle system 100 is built on. The integration framework 110 provides services to the chronicle platform 105 tenant and the institutes 115 tenants. The integration framework 110 is the first interface between both the data services 180 and the institutes 115 and the chronicle platform 105. The integration framework 110 therefore receives and sends HTTP(s) requests and responses to the institutes 115, the data services 180, and the chronicle platform 105. The integration platform 110 transforms embedded data in HTTP(s) requests and responses from a source data format of the requester or responder into a target data format for the intended recipient.

An access manager 475 controls input access to the integration platform 110. The access manager uses any known source of access authorization to align credentials of the input data to a target and source credentials 480. For instance, the access manager compares the input data credential to the corresponding credential in the target and source credential 480 and allows processing to continue if they match. In other cases, an encryption code from the target and source credentials 480 is used with the input data encryption key to decrypt the input data.

The input controller 415 receives and filters HTTP(s) requests and responses from the institutes 115, the data services 280, and the chronicle platform 105. The input controller 415 stores the data from the HTTP(s) requests and responses in a source cache 420 and waits until all data to be transformed is received and stored in source cache 420. The input controller 415 then sends the filtered response to a workflow processor 470 once all data is cached and ready to be transformed. For instance, when the extension service 135 sends an HTTP(s) response containing embedded extension data, the input controller 415 filters the HTTP(s) response to strip the embedded extension data, stores the data, checks to makes sure the data is complete, and sends the filtered response to workflow processor 470.

The workflow processor 470 manages all processes and interactions in the integration framework 110. The workflow processor 470 receives filtered requests and responses from the input controller 415. The workflow processor 470 calculates the mapping index and the session index necessary to transform the source data format to the target data format. The workflow processor 470 starts the process of transforming source data formats to target data formats by instructing a repository server 435 to retrieve mapping and session data relating the source data format to the target data format. The repository server 435 retrieves the mapping and session data and passes it to a load manager 440. The mapping maps the source data format to the target data format. The session is a set of instructions that describe how and when to transform the source data format to the target data format.

The load manager 440 validates the source and target by accessing the target and source credential 480 and only continues the process of transforming the data if there is proper validation. The load manager 440 triggers a transform manager 445 to transform the source data format to the target data format using the mapping and the session. For instance, when a source sends data in CSV format and the target requires the data in a text file, the session instructs the transform manager 445 how and when to convert from CVS to text and the transform manager 445 uses the mapping to map CVS fields to text fields. The transform manager 445 sends transformed data to a target cache 460 until all data is transformed. Once the target cache 460 contains all of the transformed data, an output controller 455 embeds the transformed data into an HTTP(s) response or request. In some cases, for example, the output controller 455 embeds the data using JSON or XML. The output controller 455 sends the HTTP(s) response to the target.

Figure 5:
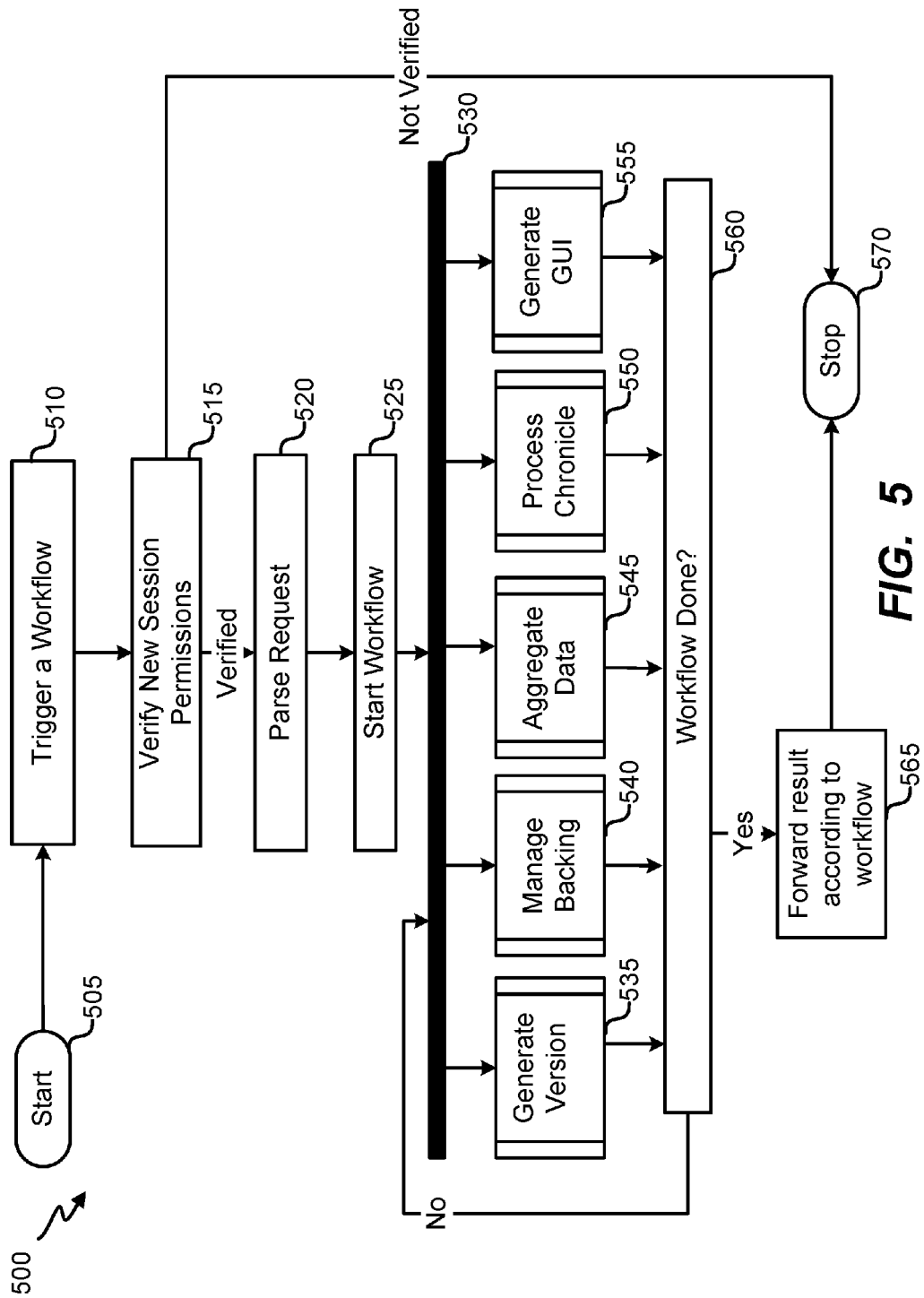
FIG. 5 illustrates a flowchart of an embodiment of a process for processing a resource request.

FIG. 5 illustrates a flowchart of an embodiment of a process 500 for processing the resource request in the chronicle platform 105. The process starts at block 505 when an event triggers a first workflow as shown in block 510. Any number of events occurring internal to the chronicle platform 105 and external to the chronicle platform 105 can trigger the first workflow in any number of ways. Each of the GUI generator 375, the data aggregator 380, the chronicle processor 385, the backing processor 390, and the version generator 395 will, in some cases, trigger a second workflow while in the midst of processing the first workflow. For instance, the chronicle processor 385 can trigger the second workflow when it calculates and/or detects a predetermined condition such as receiving data from data services 180, and the data aggregator 380 can trigger a third workflow when it calculates and/or detects a value that falls into a predetermined range, such as when the aggregate value of an end-user's annual returns are below a specified level. And, for instance, when the institutes 115 make any request related to processing the resource request they trigger a fourth workflow. The access framework 370, in some (but not other) instances, must verify credentials and permissions for the first workflow as shown in block 515. The access framework 370 can use any number of methods to verify credentials and permission including comparing credentials to those stored in institute credentials 355. If the access framework 370 cannot verify the credentials and permissions, the first workflow stops as shown in block 570. The data processor 360 filters the external HTTP(s) requests and responses for the first workflow request before the workflow manager 325 parses the request as shown in block 520.

The GUI generator 375, the data aggregator 380, the chronicle processor 385, the backing processor 390, and the version generator 395 are all connected to a synchronization bar 530. The workflow manager 325 synchronizes the GUI generator 375, the data aggregator 380, the chronicle processor 385, the backing processor 390, and the version generator 395 as shown in the synchronization bar 530. The workflow manager 325 calculates which of the GUI generator 375, the data aggregator 380, the chronicle processor 385, the backing processor 390, and the version generator 395 processes can run simultaneously and which must wait for the output of another processes. The workflow manager 325 initiates each process accordingly. For example, at block 545, the data aggregator 380 can aggregate data for a given request that may include content objects, data composite values and/or processing results pertaining to a single request or to multiple requests. The chronicle processor 385 can organize the data to generate or update a chronicle corresponding to the request. At block 550, the chronicle processor 385 can process the data from a chronicle to identify missing content objects and/or data (e.g., composite values and/or processing results), whether one or more values satisfy a given condition (e.g., exceed one or more thresholds in one or more defined directions), a status of one or more content objects or resource memorandum, and so on. At block 555, the GUI generator 375 can generate one or more GUIs based on the processing (e.g., to identify missing content objects or data, present an alert of missing data, present a processing alert and/or convey a status).

As shown in the workflow done block 560, when each process is finished the workflow manager 325 computes whether the GUI generator 375, the data aggregator 380, the chronicle processor 385, the backing processor 390, and the version generator 395 processes are complete or if there are processes that still need to be initiated. The workflow manager 325 continues to check if everything is complete at block 560 until all processes in the first workflow are complete. Any number of iterations of starting a new process can happen in block 560 since any of the GUI generator 375, the data aggregator 380, the chronicle processor 385, the backing processor 390, and the version generator 395 processes can trigger a successive workflow. Once there are no more processes to initiate, the workflow manager 325 computes the destination of where it should route the result of the first workflow and forwards it there as shown in box 565. The workflow stops as shown in block 570. Once the first workflow is triggered as shown in block 510, the process 500 for processing a resource request can start again at block 505 if a second workflow or successive workflow is triggered even if the first workflow has not reached block 570 since the workflow manager 325 controls the synchronization as shown in synchronization bar 530.

Figure 6:
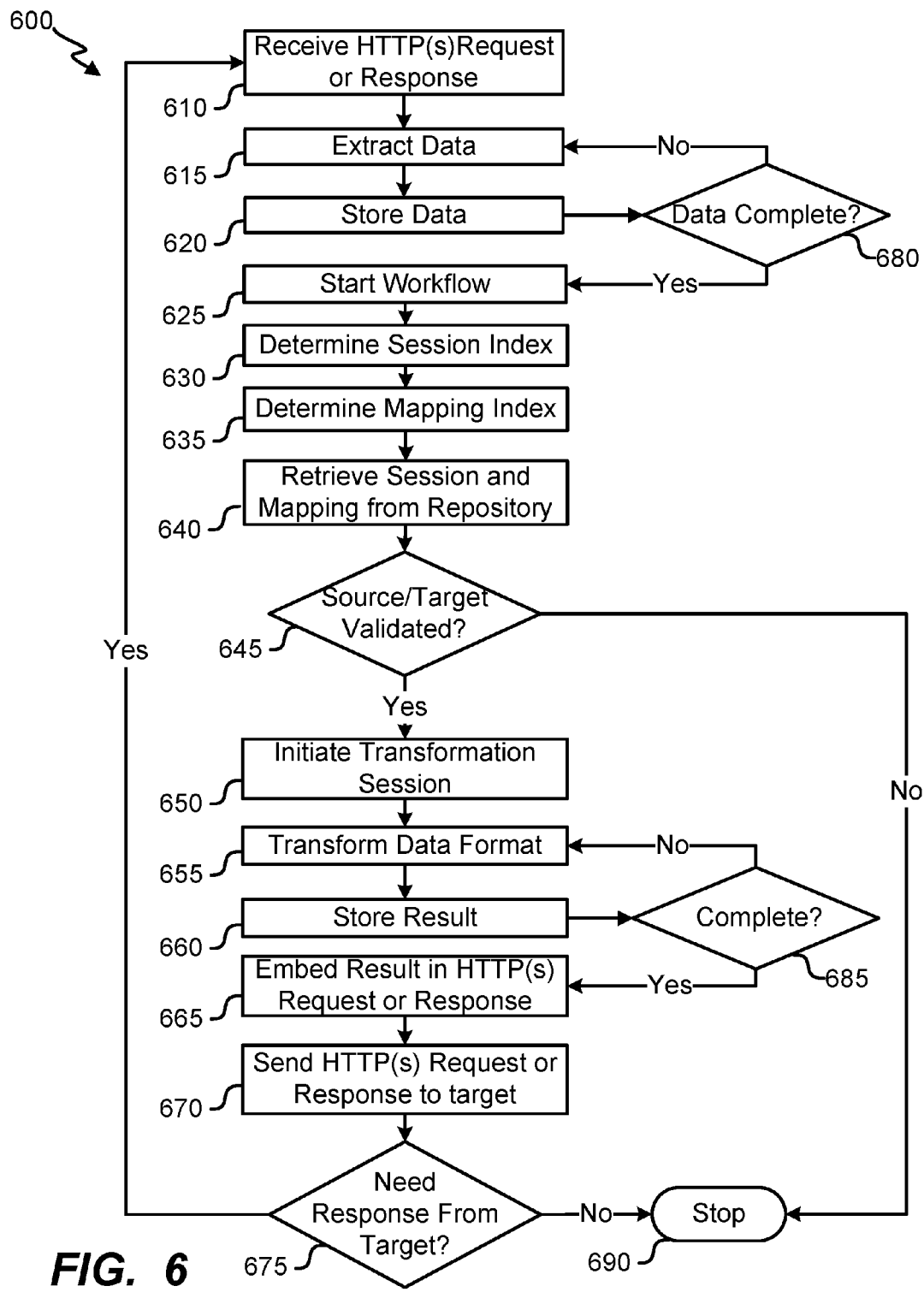
FIG. 6 illustrates a flowchart of the embodiment of a process for transforming the source data format to the target data format.

FIG. 6 illustrates a flowchart of the embodiment of a process 600 for transforming the source data format to the target data format. The data interface 365 and the user interface 320 on the chronicle platform 105 receive and transmit data in a first predetermined format. The integration platform 110 executes the process 600 for transforming the source data format to the data format configuration of the data interface 365 and the user interface 320 on the chronicle platform 105 received from the institutes 115 and the data services 180. Conversely, the data services 180 receives and transmits data in a second predetermined format and the institutes 115 transmit and receive data in a third predetermined format. The integration platform 110 also executes the process 600 for transforming the source data format to the target data format for data received by the institutes 115 and the data services 180.

Block 605 shows the start of the process 600 for transforming the source data format to the target format data. The input controller 415 on integration framework 110 receives the HTTP(s) request or response as shown in block 610. The input controller 415 extracts the data from the HTTP(s) as shown in block 615 and stores it in the source cache 420 as shown in block 620. The input controller 415 then checks to make sure that it has received all of the source data as shown in decision block 680. If the input controller 415 has not stored all of the source data it starts the extraction process again as shown in block 615. The input controller 415 will continue to check to make sure it has stored all of the source data in source cache 420 until none is remaining to store, and then the workflow processor 470 starts the workflow as shown in block 625. The workflow processor 470 calculates the session index and the mapping index as shown in blocks 630 and 635 and passes the session index and the mapping index on to the repository server 435. The repository server 435 retrieves the session from the session repository and the mapping from the mapping repository as shown in block 640. The mapping maps the source data format to the target data format. The session is a set of instructions that describe how and when to move the source data format to the target data format.

The load manager 440 validates the target and source credentials as shown in block 645 by matching them to the target and source credentials 480. If the load manager 440 cannot validate the target and source credentials the transformation process stops as shown in block 690. If the load manager 440 validates the target and source credentials it initiates the transformation session as shown in block 650 by triggering the transform manager 445 to start transforming the source data format. The transform manager 445 uses the mapping and the session to transform the source data format for data in the source cache 420 to the target data format as shown in block 655. The transform manager 445 stores the transformed data in the target cache 460 as shown in block 660. The transformation manager then checks to make sure that it has transformed and stored all of the data from the source cache 420, as shown in decision block 685. If the transform manager 445 has not transformed and stored all of the data from the source cache 420, it continues to transform the source data format as shown in block 655 and stores transformed data in the target cache 460 as shown in block 660.

The transform manager 445 iteratively checks to make sure it has transformed all of the data as shown in 685 and stored all of the transformed data in the target cache 460 as shown in blocks 655 and 660. The output controller 455 then embeds the data in the HTTP(s) request or response as shown in block 670 and transmits the data to the target. The workflow processor 470 then determines if the HTTP(s) request or response requires a response as shown in decision block 675 and generates instructions for the input controller 415. One such instance would be when the integration platform 110 sends a request for data from the data services 180. In that case integration platform 110 would need the data from the response from the data services 180 that contains the data it requested. If no response is required, the process 600 for transforming the source data format to the target data format is over as depicted at the block 690. The input controller 415 receives the HTTP(s) response as shown in block 610 if the decision block 675 makes is affirmative and the workflow processor 470 will start the transformation process from block 615 and proceed until it reaches block 690 and stops.

Figure 7A:
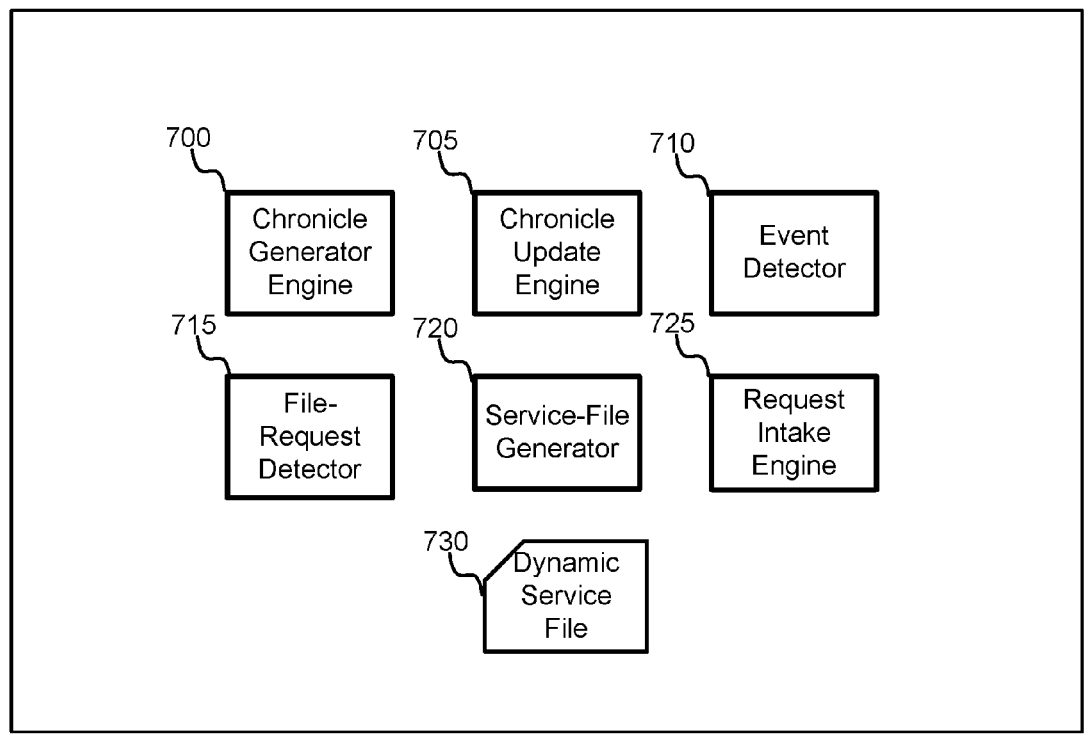
FIG. 7A shows a block diagram of an embodiment of the chronicle processor 385.

Referring next to FIG. 7A, a block diagram of an embodiment of the chronicle processor 385 is shown. Generally, the chronicle processor 385 can build the chronicles associated with resource requests. The chronicle processor 385 can use the chronicle platform 105 to generate, in real-time, dynamic service files 730 that contain the resource memorandum as well a summary overview that provide summarized and/or detailed information about the chronicles that may be of interest to a user.

The chronicle processor 385 can include a request intake engine 725 that detects requests. The requests can be made by a delegate device 205, exposure device 210, approval device 215, deception device 220, reviewer device 225, eavesdropper device 230, representative device 235, end-user device 250, watchdog device 255, eavesdrop device 260 or any other device that interacts with the institute 115. The request intake engine 725 can determine that the data relates to a new request, e.g., based on the type of information detected or by conducting a search to determine whether the request was otherwise in the system. The chronicle update engine 705 can update existing chronicles according to the request.

Upon detection of a new request, a chronicle generator engine 700 can generate one or more chronicles associated with the request. A chronicle can be associated with one or more requestors or requests.

The chronicle generator engine 700 can generate a chronicle that includes information available from the detected request. The chronicles can also include a set of content objects (e.g., documents), which can be provided by agent devices.

Figure 7B:
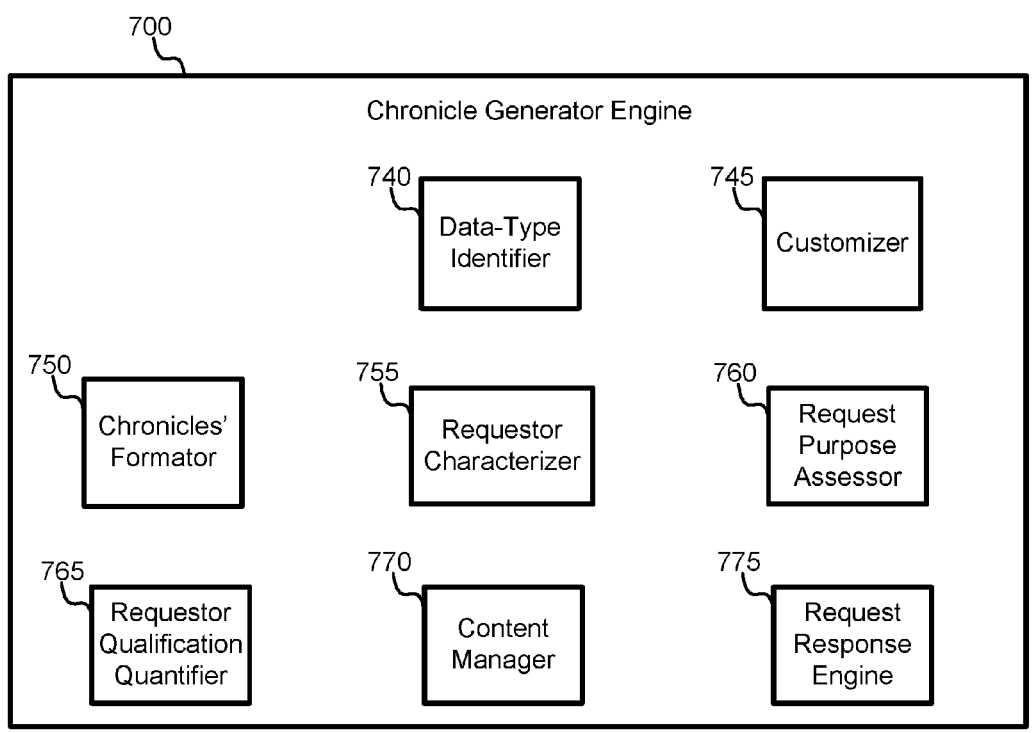
FIG. 7B shows a block diagram of an embodiment of the chronicle generator engine.

FIG. 7B shows a block diagram of an embodiment of the chronicle generator engine 700. The chronicle generator engine 700 includes a data-type identifier 740 that determines what type of information that is to be collected for the chronicle. The data-type identifier 740 can make this determination based one or more regulations and/or one or more. The data-type identifier 740 can identify data types that can, should or must be collected by institutions per the regulations or policies. The data-type identifier 740 can thereafter define a list of content objects, a list of fields and/or possible field values (e.g., list options) to be collected within a chronicle.

In some instances, the data-type identifier 740 additionally or alternatively determines what type of information is to be collected based on user input received by a customizer

745. The user providing input can include an agent, such as an agent with particular authority to customize the content manager 770. The customizer 745 can present customization options to the user via a webpage or an application interface (e.g., to be presented on a mobile device). The user can enter data, e.g., by selecting between presented option (e.g., selecting a radio button or an item on a drop-down list) or entering a number or text. The customization can allow the user to tailor one or more aspects of the chronicle engine (e.g., formats of generated chronicles, operation of the content manager 770, formats of dynamic service files 730, agent authorizations ad/or agent responsibilities) to needs of a particular industry, institution or individual (e.g., a CEO's concerns). For example, using the customizer 745, the user can identify: what type of information and/or documents are to be collected about a resource requestor and/or a requested service or product, whether each information field and/or document is required or optional, a deadline for receiving information and/or a document, and/or one or more agents responsible for collecting or approving information and/or a document. The customizer 745 can further be used to define internal.

A chronicles' formatter 750 can identify a formatting for a chronicle. The chronicle formatter 750 can identify which types of entries may be entered for specific fields. Once the information to be collected within a chronicle has been identified, information to populate the information fields can be collected by one or more components (e.g., components of the chronicle generator engine 700 or a chronicle update engine 705, described in further detail below). The chronicle generator engine 700 can include, e.g., a requestor characterizer 755, a request purpose assessor 760 and a requestor qualification quantifier 765. Each of these components can determine specific information about a requestor, e.g., by generating one or more electronic or non-electronic forms to be completed by or on behalf of a requestor, by electronically parsing content objects or data to identify the information, by searching for the requestor within a database and/or inferring or determining the information based on other available information. The information determined by the requestor characterizer 765, the request purpose assessor 760 and/or requestor qualification quantifier 765 can be used to populate field entries within a chronicle (e.g., having a format defined by chronicle formatter 750).

The chronicle generator engine 700 can include a content manager 770 that receives and manages content objects (e.g., content files such as documents) pertaining to a request. The content objects can be stored within or associated with a storage area associated with a chronicle. In some instances, one or more other components of chronicle generator engine 700 (e.g., the requestor characterizer 755, the request purpose assessor 760 or the requestor qualification quantifier 765) determine information by extracting data from content objects managed by content manager 770. In some instances, information determined by one or more other components of chronicle generator engine 700 is used to populate content objects managed by content manager 770.

Figure 7C:
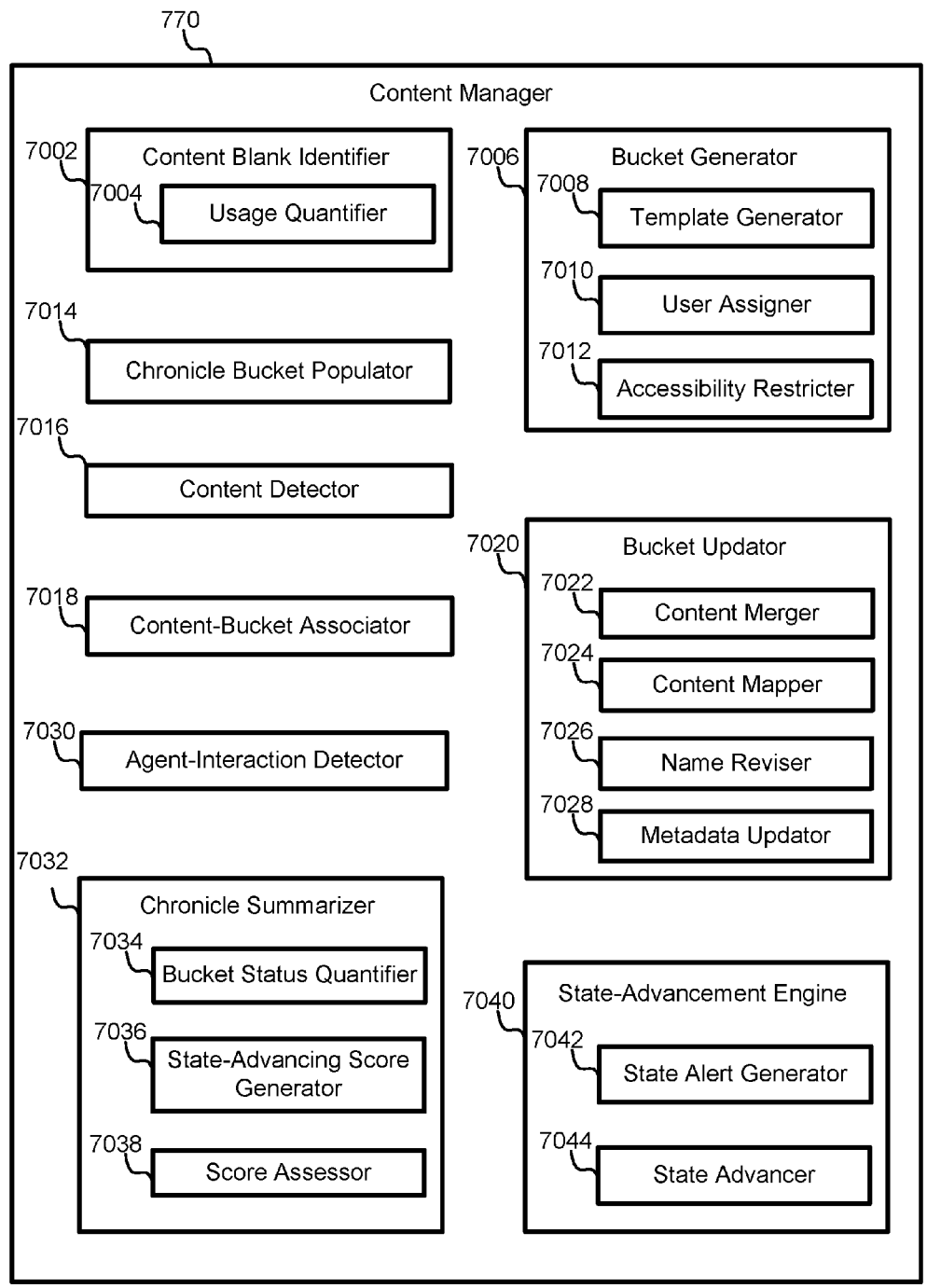
FIG. 7C shows a block diagram of an embodiment of the content manager.

FIG. 7C shows a block diagram of an embodiment of the content manager 770. Content manager 770 can manage content associated with one or more storage area, such as a storage area associated with a chronicle. One or more devices (e.g., a single computer, a network of computers, a cloud computing system) can provide the storage area. The storage area can be predefined (e.g., allocated a predetermined storage space) or dynamically defined (e.g., allocated successively more storage as content is added to the storage space or repeatedly redefined as content objects already stored are associated with the storage area). Each storage space can be associated with one or more chronicles.

The content manager 770 includes a content blank identifier 7002 that determines required and/or optional contents to be included in and/or associated with a chronicle. The content blank identifier 7002 can generate one or more lists of content-object blanks. This list is a "blank" list, in that the content objects need not exist (and, in some instances, do not exist) before they are identified. The list can include content objects that are allowed to be associated with a chronicle and/or that are required to be associated with a chronicle. In some instances, different lists identify the blanks for required content objects and for optional content objects. One, more or all generated lists may or may not be comprehensive. For example, if a chronicle is associated with a non-comprehensive set of lists, a content object not identified in the lists could nonetheless be stored in and/or associated with the chronicle.

The content blank identifier 7002 can determine which content blanks to include in the lists by, e.g., reviewing a characterization of the chronicle, receiving user input, accessing data regarding applicable regulations or quantifying usage patterns. The agent input can include high-level or low-level input. For example, in some instances, a programmer defines lists to be associated with different types of. The content blank identifier 7002 can thereafter identify an appropriate content-blank list by looking up the list(s) associated with a particular chronicle type. In a similar instance, a client (e.g., a bank official or employee) can define or adjust the chronicle-type-dependent lists (e.g., during an initiation of content manager 770 or during an organizational update), as described in further detail below. As an example of use of low-level input, the list could be defined based on user input (e.g., from a client) upon an initiation of an individual chronicle. Thus, the higher-level user input generalizes lists across a set of potential chronicles, while lower-level user input is tied more closely to a specific chronicle.

The content blank identifier 7002 can communicate with data-type identifier 740 to automatically identify part or all of the content blanks to include in the list. For example, the data-type identifier 740 can look up one or more policies or regulations associated with a chronicle or type of chronicle. The data-type identifier 740 can then transmit the determinations to the content blank identifier 7002 of the content manager 770.

The content blank identifier 7002 can further or alternatively determine the content blanks based on usage patterns. As shown in the embodiment of FIG. 7C, the content blank identifier 7002 includes a usage quantifier 7004, which quantifies historical usage properties. Usage quantifier 7004 can then revise the default content-blank list to remove those content blanks which users seldom interacted with and to add content blanks associated with the other content objects.

After the content blanks have been identified, a bucket generator 7006 can generate a bucket for each content blank. A generated bucket can include a name of a content object and one or more properties of the content object. For example, the bucket can indicate one or more acceptable file types, user assignments, user authorizations, and/or date restrictions. The bucket generator 7006 includes a template generator 7008, which can generate a template for a content object to be associated with the bucket.

In some instances, the template generator 7008 generates an example of a content object. The content object can be configured such that example data can be over-written and such that example data and subsequently entered data is presented in different manners (e.g., the example data being highlighted in gray or italicized).

The bucket generator 7006 includes a user assigner 7010 which can identify a user assignment or set of user assignments to be associated with the bucket. User assignments can indicate which users are assigned to tasks such as uploading the content object, inputting data into the bucket, reviewing the content object, and/or approving the content object.

The bucket generator 7006 includes an accessibility restricter 7012 that can identify which users are authorized to perform specific actions for a bucket. For example, the accessibility restricter 7012 can indicate which users can upload a content object, view a content object, edit a content object, approve a content object, comment about a content object, see a summary based on the content object, view an existence of a bucket associated with a content object, or view a status of a bucket associated with a content object.

Thus, in some instances, a generated bucket can include an incomplete content object (e.g., a template) but need not. In some instances, the generated bucket includes data other than a content object, such as metadata identifying user assignments or accessibility restrictions. The metadata can further indicate a status of a bucket such as empty, partly full (e.g., template created), full, finalized, edited, reviewed, or approved.

Upon generation of one or more buckets, a storage area associated with a chronicle can be populated by a chronicle bucket populator 7014 to include the buckets. This population can include saving content objects and/or other data to a storage area associated with a chronicle or otherwise associating the content objects and/or other data with the chronicle (e.g., via mapping). The buckets can be presented (e.g., visually identified) to some or all users subsequent to the population. Buckets may be invisible to or locked from users not authorized to view content objects of the bucket.

The content manager 770 includes a content detector 7016 that can detect a content object. The detection can include detecting that a new content object is being created (e.g., a user is opening a blank document generally, in a particular program or meeting other criteria), detecting that a user is attempting to save a content object (e.g., generally or within a specific storage area associated with a chronicle), detecting that a content object has been uploaded or otherwise received (e.g., via an electronic transmission over the Internet), detecting that a user is attempting to move a content object (e.g., to a specific storage area associated with a chronicle), or detecting that a user is attempting to rename a content object.

A content-bucket associator 7018 can identify a bucket and/or chronicle to be associated with the detected content object. In some instances, content-bucket associator 7018 determines that a content object is not to be associated with any existing bucket and/or chronicle. For example, automatic analyze can indicate poor matches between data associated with the content object and existing buckets and/or chronicles or a user can indicate that the content object corresponds to a "new" bucket or chronicle. In these instances, a new bucket can be generated by bucket generator 7006 to be associated with the content object. A user can provide information, such as the bucket's name and properties, or this data (e.g., metadata) can be extracted from the content object.

A bucket updator 7020 can then update data associated with a chronicle and/or bucket to include the content object or to include an identification (e.g., a storage location) of the detected content object. In some instances, the bucket updator saves the content object within a storage area associated with the bucket and/or chronicle. The saving can include an initial saving of the content object, resaving the content object (thereby duplicating the content object) or resaving the content object and deleting the original. The bucket updator 7020 includes a content merger 7022 that can merge content from a content object to a bucket. For example, detected content object can include a list of information (e.g., generated in response to a program's execution). The information can be used to fill in blanks in a bucket's templates. As another example, the content merger 7022 can move or copy metadata associated with a bucket to be included in metadata associated with the content object.

In some instances, the bucket updator 7020 includes a content mapper 7024 that identifies a storage location of the content object. The mapped storage location can be stored in a storage location associated with a bucket or chronicle or in a central location. For example, a look-up table can store, for each of a set of chronicles, maps created for content objects associated with the chronicle.

The bucket updator 7020 includes a name reviser 7026 that revises a default name (e.g., "Document 1" or name used during a previous save) to a name associated with a bucket. The bucket updator 7020 further includes a metadata updator 7028 that updates metadata associated with a bucket. For example, after a content object is saved within a bucket, a status of the bucket can be updated to reflect that the bucket is filled. The metadata can further reflect a date of the bucket's update and an agent initiating and coordinating the update. The metadata can further indicate a next action.

The content manager 770 includes an agent-interaction detector 7030 which detects interactions between an agent and a bucket. In some instances, these types of detected interactions lead to a detection of content by the content detector 7016. Alternatively or additionally, these interactions can result in further updates implemented by the bucket updator 7020. For example, the agent-interaction detector 7030 can detect a user, an interaction time and an interaction type associated with one or more types of interaction. The user can be identified based on a user logged into a system, an IP address, or a self-identification. The interaction type can include viewing data (e.g., metadata) associated with a bucket, viewing a content object associated with a bucket, editing a content object associated with a bucket, making a comment regarding a content object associated with a bucket, approving a content object associated with a bucket, locking a content object associated with a bucket (such that it can no longer be edited or deleted), or deleting a content object associated with a bucket. Comments made by users do not result in a modification of the actual content object but are rather associated with the content object at a higher layer. The comments can be available to some agents, and not to others. For example, a comment can be made by one agent for another agent, such that the note is only available to the two agents. In some instances, a detected interaction includes a failed attempt to perform an interaction that, e.g., failed due to a lack of user authorization to perform the interaction. Interactions (or failed interaction attempts) can result in the metadata updator 7028 updating metadata associated with a bucket (e.g., to identify the interaction or update the bucket's status).

The content manager 770 includes a chronicle summarizer 7032 that summarizes a state of a chronicle. The chronicle summarizer 7032 can include a bucket status quantifier 7034 that determines which buckets, of the buckets associated with a chronicle, meet a particular status criterion. For example, the bucket status quantifier 7034 can determine what fraction (or number) of the buckets are empty, what fraction (or number) of the buckets are filled and/or what fraction (or number) of the buckets are filled. The bucket status quantifier 7034 can determine a fraction of the buckets that meet at least a threshold status along a status hierarchy (e.g., being at least filled). The bucket status quantifier 7034 can determine a distribution of statuses (e.g., 42% empty, 35% filled, 13% filled and edited, and 10% approved). In some instances, the quantification accounts for whether a status of a bucket must be met or may be met. For example, Chronicle X could include 15 buckets that must be filled and approved, 5 buckets that are preferably to be filled and approved, and 10 buckets that may be filled and approved. The bucket status quantifier 7034 can summarize the status for one, more or each of these bucket groups. The bucket status quantifier 7034 can further identify agents or agent types responsible for buckets that have not reached a desired status.

The chronicle summarizer 7032 further includes a state-advancing score generator 7036 that generates one or more scores relevant to an issue as to whether a state of a chronicle should be advanced.

Each state transition can be associated with one or more criteria pertaining to a state of the chronicle. For example, the criteria can indicate requisite statuses of one or more buckets. The criterion can be stored in a state-advancing criteria database, which can include general criteria, state-advancing criteria for different kinds of chronicles or state-advancing criteria for specific chronicles. A chronicle may, in some embodiments, need to advance through each state in order to progress to the next state. In some embodiments, the chronicle can skip states if it meets entry criteria of the final state.

The state-advancing score generator 7036 can assign points to a chronicle based on properties of the individual buckets or groups of buckets. For example, a point can be assigned to each bucket that is filled, and two points can be assigned to each bucket that is filled and approved. As another example, a point can be assigned if each "required" bucket is filled. As yet another example, a point can be assigned for each state-advancing criterion that is fulfilled (e.g., "At least one of Buckets 1-5 filled", "Each of Buckets 6-8 filled and approved", "Bucket 10 edited and finalized by Agent #105). The assigned points can be added together, added together within groups (e.g., each group pertaining to one criterion) or kept separately.

A score assessor 7038 can assess the generated score(s) in order to determine whether the chronicle is eligible to advance states. The score assessor can compare the score(s) to one or more thresholds. The thresholds can be identified in state-advancement criteria. The score assessor 7038 can determine, e.g., whether a chronicle is eligible to advance to a next state or which state the chronicle is eligible to advance to (e.g., allowing state jumps).

A state-advancement engine 7040 receives the chronicle summary generated by the chronicle summarizer 7032 and determines whether the chronicle is to advance states. In some instances, the state advancement is automatic upon a determination that the chronicle has met state-advancing criteria. For example, if the score assessor 7038 determines that the state-advancing score exceeds an applicable state-advancing threshold, the state can be automatically advanced.

In some instances, an agent must authorize the advancement. Upon a determination by the score assessor 7038 that a chronicle is eligible for state advancement, a state alert generator 7042 can generates and transmits an alert identifying the eligibility. The alert can identify the chronicle, a summary of bucket statuses of the chronicle, a current state, a potential next state, a state-advancement criterion, and/or the state-advancing score. The alert can be transmitted to an agent authorized to authorize the state advancement. The state-advancement engine 7040 can be notified if and when the authorized user authorizes the state advancement.

Upon a detection of the automatic advancement criteria being fulfilled or a notification that a user authorized the advancement, a state advancer 7044 can advance a state of the chronicle. In some instances, a result of the advancement is that the content blank identifier 7002 identifies new content blanks, the bucket generator 7006 generates new buckets and/or the chronicle bucket populator 7014 populates the chronicle with the new buckets. In some instances, a result of the advancement is that the bucket updator 7020 updates metadata of one or more buckets to include new expected bucket statuses and/or user assignments. In some instances, a result of the advancement is that an automatic analysis (e.g., a suggested request-approval-decision analysis or analysis identifying a type or cost of an available service or product) be initiated.

Thus, the content manager 770 allows a series of chronicles to be uniformly organized and managed. Content objects within each chronicle can be consistently named and easily searched, and state-advancement criteria can be easily and consistently applied.

Referring next to FIG. 7D, an example of an overview 790 of a generated chronicle in a financial-service industry according to an embodiment is shown. The overview 790 can be built from data entered by one or more agents or from data extracted from one or more content objects. The first section of the overview 790 includes information about or provided by a resource requestor. The information can include identification information, characteristics about the requestor, request purposes, and the requestor's qualifications. The second section of the overview 790 includes information obtained from third parties, such as data services 180. These variables can be extracted from content objects associated with the chronicle. The third section of the overview 790 can include automatically calculated variables or variables determined by an internal agent (e.g., an agent of a financial institution). For example, the variables can include a suggested action based on an automated calculation. In the depicted instance, not all fields of the overview 790 are completed. The consequence of the incompleteness can be determined, e.g., based on the chronicle formatter 750. In some instances if a field is not completed no further action on the chronicle can be taken. The overview 790 is exemplary. In other embodiments, the overview 790 can include additional information such as a list of required content objects, a list of uploaded content objects, a list of missing content objects, and a list of all agents interactioning with the chronicle and the type of interaction.

Figure 7E:
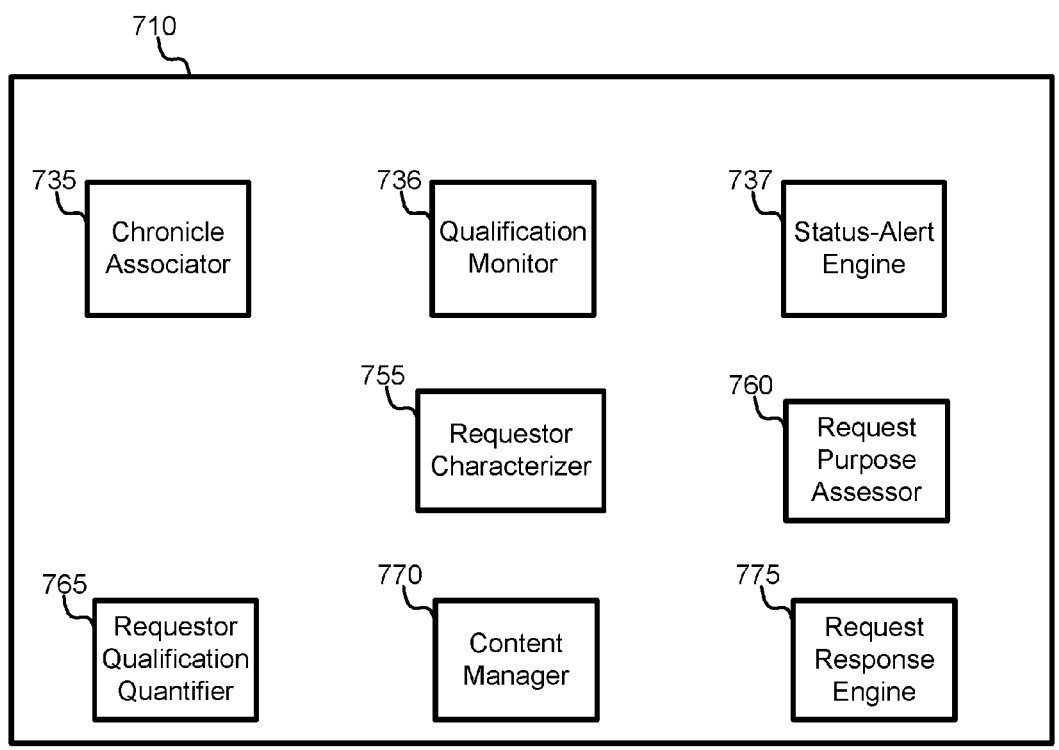
FIG. 7E shows a block diagram of an event detector.

As shown in FIG. 7A, an event detector 710 can detect events such as uploaded content objects, interactions with chronicle-associated content objects (e.g., approvals), or newly entered information. The event detector can include a number of components similar to or the same as components of the chronicle generator engine 700 as shown in FIG. 7E. The event detector 710 includes a content manager 770 to generate buckets, detect new content objects, modify existing content objects, change statuses of existing buckets (to "approved"), or note interactions with buckets.

The event detector 710 includes a requestor characterizer 755, a request purpose assessor 760 and/or a requestor qualification quantifier 765 to collect and process new information for a chronicle. For example, the requestor qualification quantifier 765 can determine a qualification score based on newly received information. The event detector 710 includes a request response engine 775 such that a request response can be generated or updated based on the detected event. The request response engine 775 can initiate generation of the request response immediately (e.g., following a detected event) or at some time in the future (e.g., in order to manage service-level agreement workflow).

The event detector 710 associates a detected event with a generated chronicle. Thus, the detected events can be paired with a chronicle, such that an appropriate chronicle can be updated based on the newly obtained information. The event detector 710 can include one or more monitors, such as a qualification monitor 736. The qualification monitor 736 can monitor a qualification parameter. The event detector 710 further includes a status-alert engine 737 that can produce an alert based on a change in a chronicle status. The status alert can be presented (e.g., displayed or emailed) to one or more agents, such as an agent internal to an institute 115.

Returning to FIG. 7A, upon detection of the event, a chronicle update engine 705 can update the associated chronicle within the chronicles platform 215. For example, the chronicle update engine 705 can populate and/or update values in fields within chronicles platform defined by the chronicle formatter 750 of chronicle generator engine 700.

The chronicle processor 385 includes a file-request detector 715 that detects an event that initiates generation off a dynamic service file 730 that characterizes one or more chronicles. The detected request can further include, e.g., a requested summarization level (e.g., where a high level includes summary statistics about a group of chronicles, and a low level includes detailed information about the individual chronicles within the group), requested types of summarization, requested types of parameters to be summarized, and/or presentation types.

Figure 7F:
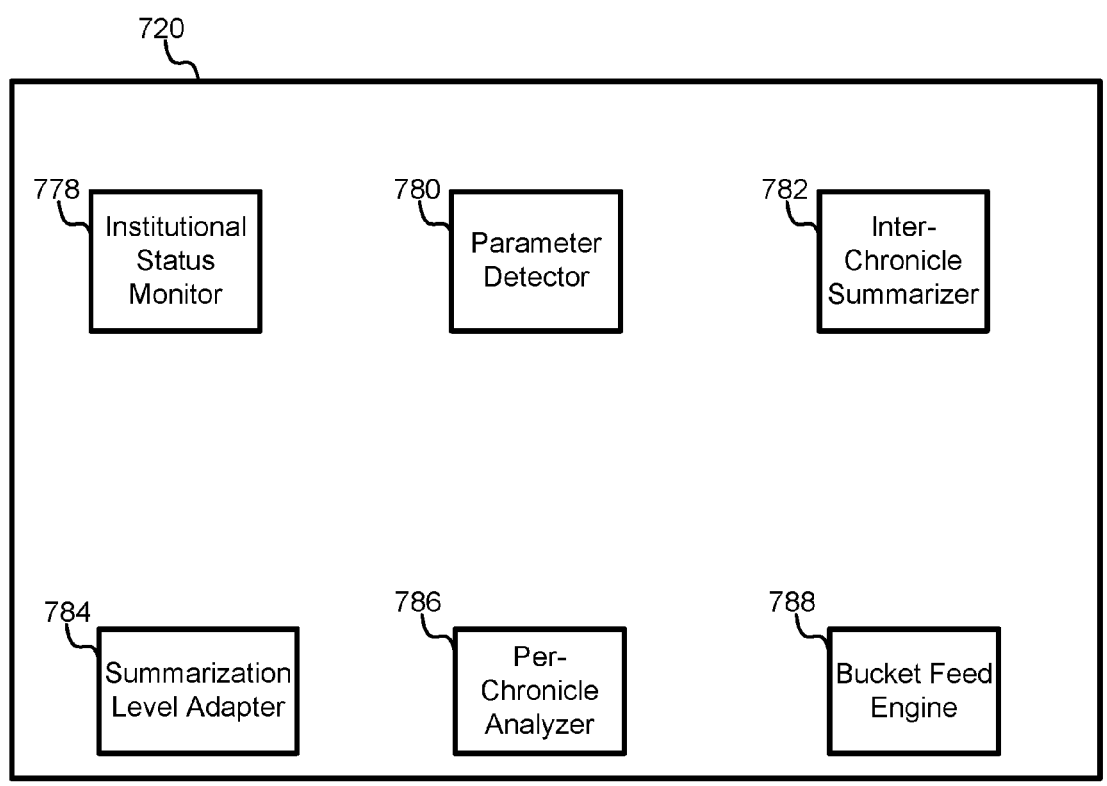
FIG. 7F shows a block diagram of an embodiment of the service-file generator.

Upon detection of the request for the dynamic service file 240, a service-file generator 720 can process the request and generate the dynamic service file 240. FIG. 7F shows a block diagram of an embodiment of the service-file generator 720. The service-file generator 720 includes a parameter detector 780 that identifies parameters of interest to be included in a generated dynamic service file 240. The parameters can include macro-parameters (each generated based on a set of chronicles) or micro-parameters (each pertaining to a specific chronicle.

The parameter detector 780 can determine that each factor is to be associated with a parameter. Alternatively or additionally, the parameter detector 780 may be able to determine a ranking or weighting for each factor. Thus, the parameter detector 780 can determine that a variable is to include a score equal to a weighted sum of the factors.

The service-file generator 720 includes an inter-chronicle summarizer 782 that generates one or more summary variables (e.g., a macro-parameter identified by the parameter detector 780. The summary variable can be generated while controlling for other parameters that may co-vary with a parameter of interest.

The service-file generator 720 includes a summarization level adapter 784, which can specify a degree to which data is summarized can be adjusted. In some instances, one or more summarization levels are simultaneously presented within a dynamic service file 730. In some instances, an agent viewing a dynamic service file 730 can adjust a summarization-level input and the presented data can be automatically adjusted to correspond with the appropriate level.

The service-file generator 720 further includes a per-chronicle analyzer 786. The per-chronicle analyzer 786 can identify one or more specific chronicles that meet a criterion. The per-chronicle analyzer 786 can further or alternatively identify micro-parameter parameters.

The service-file generator 720 further includes a bucket feed engine 788. The bucket feed engine 788 can identify a status of buckets associated with a single chronicle. For example, the bucket feed engine 788 can determine that, for a given chronicle, 8 specific buckets are filled and are complete, 4 specific buckets are filled but unfinalized, and 11 buckets are empty. The bucket feed engine 788 can further indicate whether buckets have undergone specific automatic or human-involved processing, such as review and approval by an internal agent. In some instances, the bucket feed engine 788 can further indicate statuses of non-bucket information associated with a chronicle. Thus, the bucket feed engine 788 can provide the capability of generating a dynamic service file characterizing one or more specific chronicles.

The service-file generator 720 also includes an institutional status monitor 778.

Figure 8:
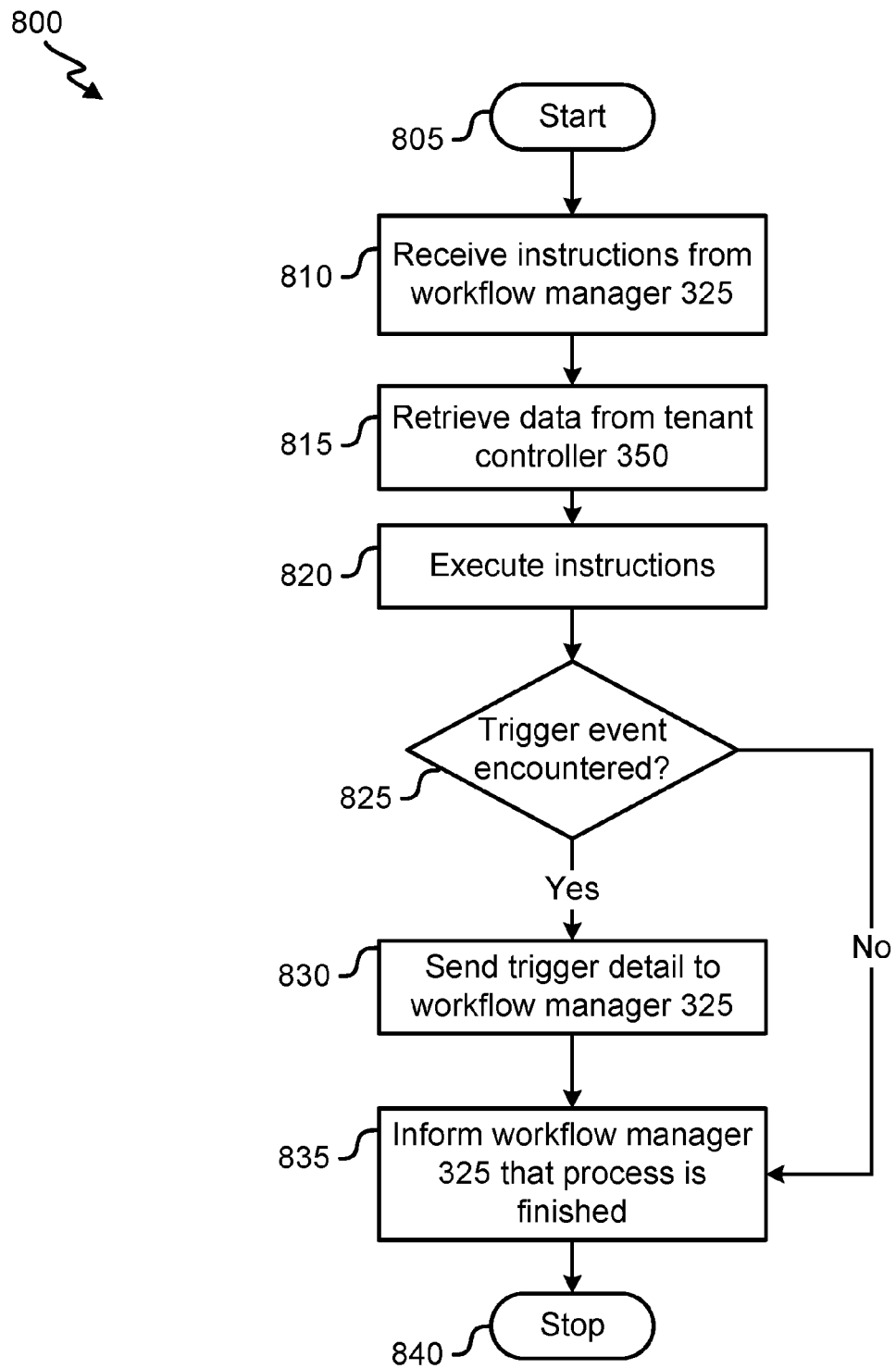
FIG. 8 illustrates a flowchart of the embodiment of a process for processing a resource request.

FIG. 8 illustrates the flowchart of an embodiment of a process 800 for processing a resource request. When the workflow manager 325 detects a trigger to process a resource request (in full or in part), it creates the instructions the chronicle processor 385 needs to process the resource request and sends them to the chronicle processor 385 as shown in block 810. The chronicle processor 385 retrieves the data it needs to process the chronicle, such as a credit report from extension service 135, as shown in block 815. The chronicle processor 385 executes the instructions as shown in block 820. At block 825, it is determined whether processing the resource request according to the instructions causes another triggering event. If so, the chronicle processor 385 sends the trigger detail to the workflow manager 325 as shown in block 830. Upon completion of sending the trigger detail or determining that another triggering event has not been encountered, the chronicle processor 385 informs the workflow manager 325 that it has finished as depicted in block 835. The process 800 is finished as shown in block 840.

Figure 9:
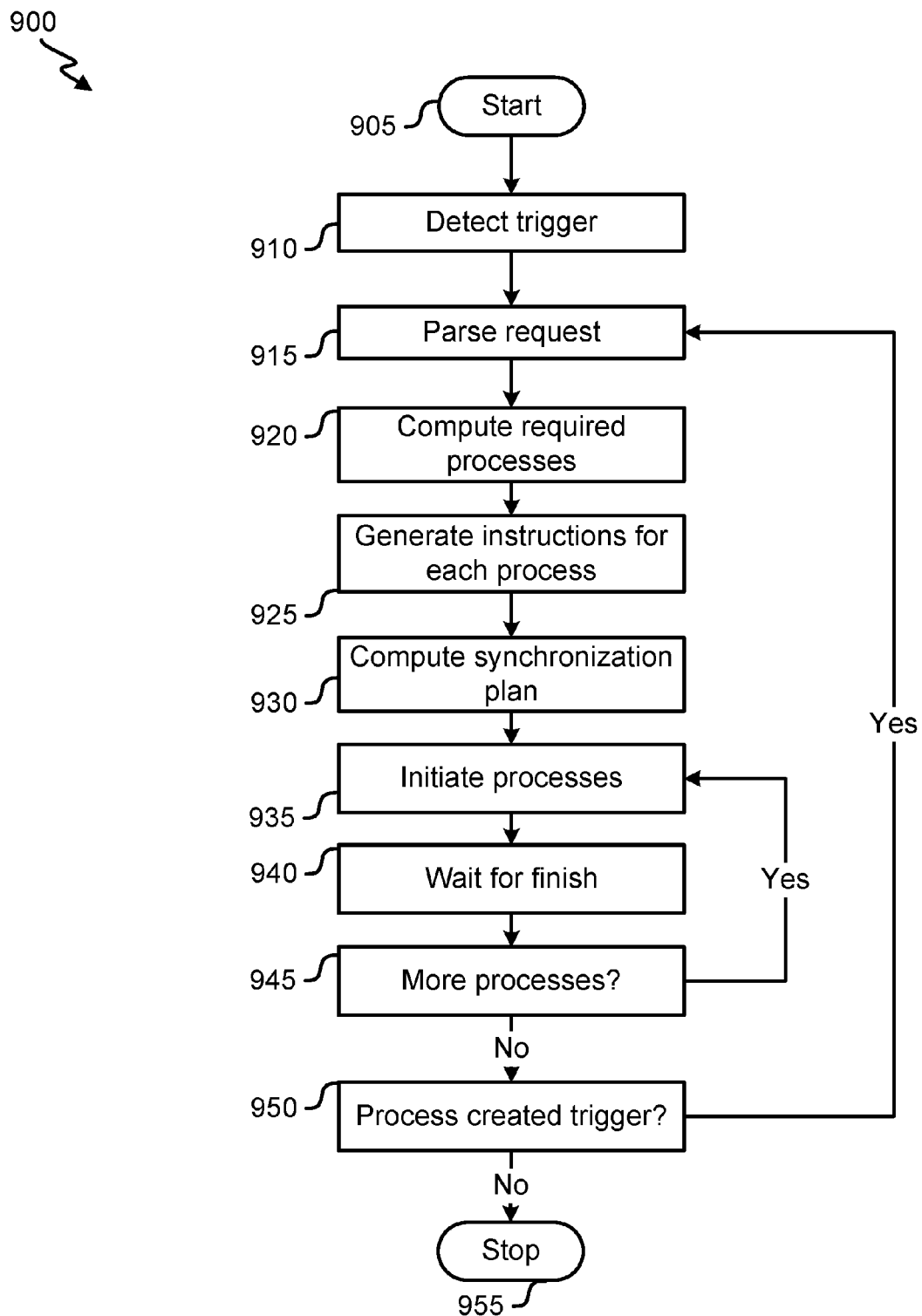
FIG. 9 illustrates the flowchart of the embodiment of a workflow manager processing a workflow.

FIG. 9 illustrates the flowchart of an embodiment of a process 900 for workflow management. When the workflow manager 325 detects a trigger to process a workflow request as shown in block 910, it parses the workflow request as shown in block 915. Because the workflow manager 325 detects triggers generated by processes internal to the chronicle platform 105 and external to it from institutes 115 and/or data services 180, the workflow manager 325 parses triggers from both sources. Once parsed, the workflow manager 325 computes which of the GUI generator 375, the data aggregator 380, the chronicle processor 385, the backing processor 390, and the version generator 395 processes are needed to resolve the workflow request as shown in block 920.

For each of the processes needed to resolve the workflow request, the workflow manager 325 generates a set of instructions as shown in block 925. The workflow manager 325 then computes a synchronization plan as shown in block 930. For instance, if the workflow request is to capture a version of the resource memorandum, the workflow manager 325 is to start the chronicle processor 385 before starting the version generator 395. There are processes that can run simultaneously, for instance the GUI generator 375 can simultaneously process the presentation for reporting receiving a credit report while version generator 395 captures the second version of the resource memorandum. The workflow manager 325 initiates the process according the synchronization plan as shown in block 935. The workflow manager 325 waits for the initiated processes to finish as shown in block 940. Once the initiated process report they are finished, the workflow manager 325 then determines if more processes are to be initiated as shown in block 945. The workflow manager 325 initiates those processes as shown in block 935. This might occur, for instance, if the chronicle processor 385 executes instructions that fill the chronicle with all required content objects to trigger a report to institutes 115 an to capture a version of the resource memorandum. Once there are no processes left to initiate, the workflow manager 325 detects new triggers that the processes generated as shown in block 950. If the workflow manager 325 detects triggers it parses those workflow requests as shown in block 915 and repeat the process 900 until there are no processes to initiate and no triggers detected as shown in in block 955.

Figure 10:
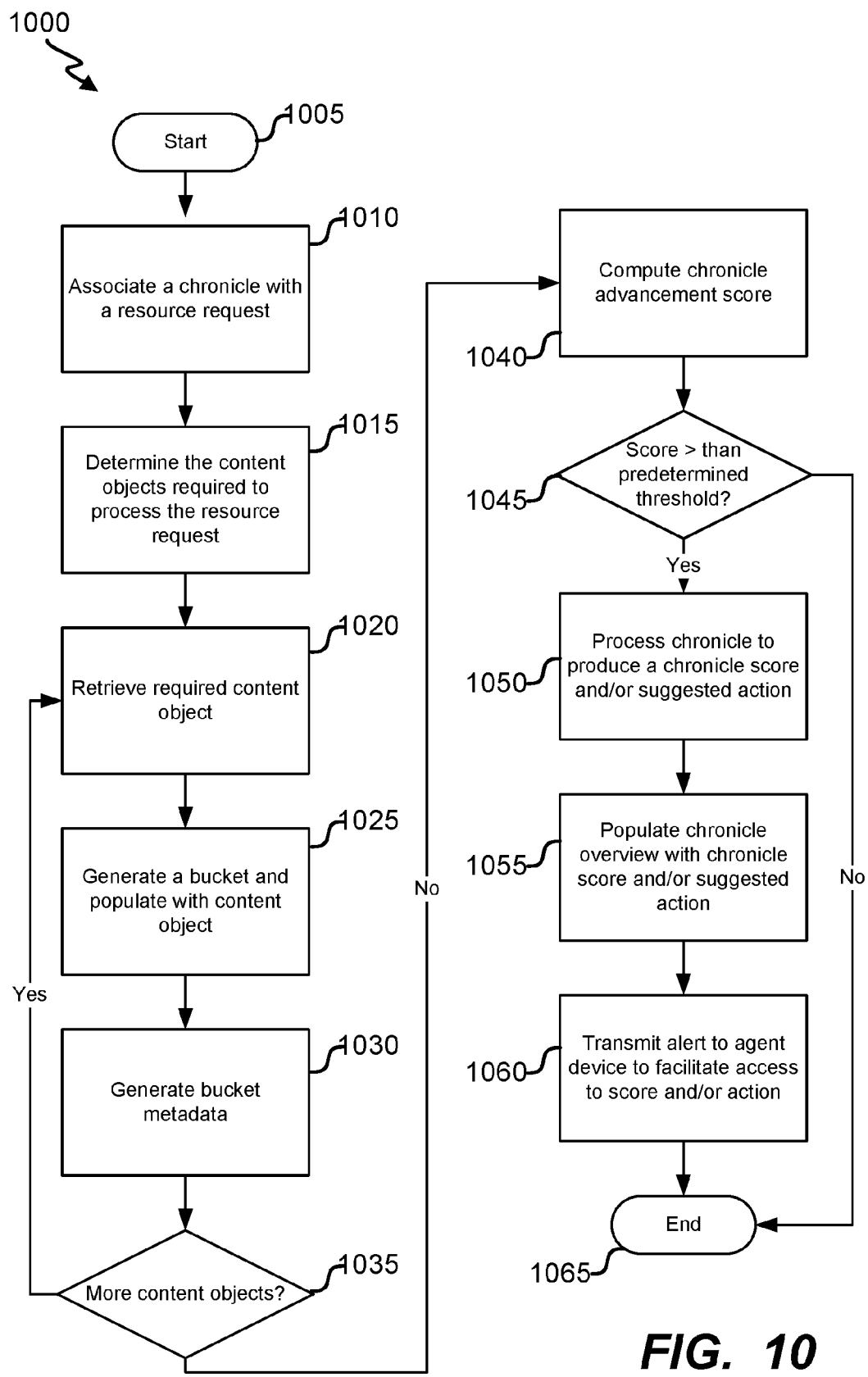
FIG. 10 illustrates a flowchart of an embodiment of a process 1000 for automated approval of resource requests.

FIG. 10 illustrates a flowchart of an embodiment of a process 1000 for automated approval of resource requests. Automated approval of resource requests decreases the time required to grant a resource request in many cases. Automated approval uses pre-determined thresholds applied to the collected data in a chronicle to Starting at step 1005, the process next associates a chronicle with a specific resource request at step 1010. Then at step 1015 the chronicle processor 385 determines the content objects required in the chronicle associated with the resource request. At step 1020, the chronicle processor 385 retrieves a required content object and a step 1025 generates a bucket in the chronicle and populates the bucket with the content object. Next at step 1030, the chronicle processor 385 generates the metadata for the bucket. As previously discussed—this can include indications that the bucket is full, among others. Next, at step 1035, the chronicle processor 385 determines if there are additional content objects to process, and if so, returns to step 1020. If there are not further content objects to process, the chronicle processor 385 next calculates an advancement score at step 1040. The advancement score can be determined, as previously discussed, in many different methods including from the meta data generated for each bucket. If the advancement score does not exceed the predetermined threshold at step 1045 then the process is finished at step 1065. However—in some embodiments there is no advancement score calculation so this step can be skipped altogether and the next step is 1050. If the advancement score exceeds a predetermined threshold at step 1045, then at step 1050 the chronicle processor 385 processes the chronicle to produce a chronicle score and suggested action at step 1050. Alternatively the chronicle processor 385 can produce a chronicle score without a suggested action or a suggested action without a chronicle score. The chronicle score and suggested actions can be computed from aggregated data from each content object, the aggregated metadata from each bucket, or a combination of both. At step 1055 the chronicle processor populates the chronicle with the chronicle score and/or suggested action. At step 1060 an agent device is sent an alert to facilitate accessing the score and or suggested action. The alert can happen wirelessly over any number of wired networks such as Ethernet, or wireless networks including 3G, 4G, and other cellular transmissions, Bluetooth, etc. The process ends at step 1065.

We fully incorporate by reference herein for all purposes: U.S. Provisional Application No. 61/714,647, filed on Oct. 16, 2012; U.S. Provisional Application No. 61/652,970, filed on May 30, 2012; U.S. Provisional Application No. 61/652, 977, filed on May 30, 2012; U.S. Provisional Application No. 61/792,011, filed on Mar. 15, 2013; U.S. Provisional Application No. 62/032,239, filed on Aug. 1, 2014; U.S. Provisional Application No. 62/102,196, filed on Jan. 12, 2015; U.S. Provisional Application No. 62/187,487, filed on Jul. 1, 2015; U.S. patent application Ser. No. 14/713,899 filed on May 15, 2015; U.S. patent application Ser. No. 14/590,714 filed on Jan. 6, 2015; U.S. Pat. No. 9,098,875 issued Aug. 4, 2015; U.S. Pat. No. 9,098,875 issued Aug. 4, 2015; U.S. Pat. No. 9,082,151 issued Jul. 14, 2015; U.S. Pat. No. 8,762,376 issued Jun. 24, 2014; and U.S. Pat. No. 8,572,083 issued Oct. 29, 2013.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interactiong with actual hardware in a meaningful way. Examples of the physical layer include Ethernet, FDDI, B8ZS, V. 35, V. 24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

We claim:

1. A system for periodically updating backings for resource requests, the system comprising:
   a resource chronicle store comprising a plurality of resource chronicles, wherein each resource chronicle of the plurality of resource chronicles is associated with a resource request, and wherein each resource request comprises a resource value;
   a backing store comprising a plurality of backings, wherein each backing of the plurality of backings provides collateral for at least one resource request, and the plurality of backings are indexed based on at least one of ownership, type, value, performance, resource request, or institute;
   a backing manager running on one or more processors, wherein for each resource chronicle of the plurality of resource chronicles, the backing manager is configured to:
      retrieve the resource chronicle from the resource chronicle store;
      determine that the resource request associated with the resource chronicle has a fulfilled status when a resource requestor has reimbursed a resource provider for the resource value;
      release one or more first backings that provide collateral for the resource request associated with the resource chronicle by, for each of the one or more first backings:
         retrieving the first backing from the backing store;
         determining whether the first backing provides collateral for an additional resource request associated with another resource chronicle by using the index to search the backing store;
         if the first backing provides collateral for the additional resource request associated with the other resource chronicle, updating the backing store to release the first backing from the resource request associated with the resource chronicle; and
         if the first backing provides collateral for only the resource request associated with the resource chronicle, updating the backing store to release the first backing from the resource provider.

2. The system for periodically updating backings for resource requests of claim 1, wherein the backings comprise at least one of real property, personal property, securities, treasury notes, automobiles, motor homes, boats, or airplanes.

3. The system for periodically updating backings for resource requests of claim 1, wherein the resource request is for a residential, business, equipment, vehicle, or personal loan.

4. A method for periodically updating backings for resource requests, the method comprising:
   storing, by a resource chronicle store, a plurality of resource chronicles, wherein each resource chronicle of the plurality of resource chronicles is associated with a resource request, and wherein each resource request comprises a resource value;
   storing, by a backing store, a plurality of backings, wherein each backing of the plurality of backings provides collateral for at least one resource request, and the plurality of backings are indexed based on at least one of ownership, type, value, performance, resource request, or institute;
   processing, by a backing manager, for each resource chronicle of the plurality of resource chronicles, to perform actions of:
      retrieving the resource chronicle from the resource chronicle store;
      determining that the resource request associated with the resource chronicle has a fulfilled status when a resource requestor has reimbursed a resource provider for the resource value;
      releasing one or more first backings that provide collateral for the resource request associated with the resource chronicle by, for each of the one or more first backings:
         retrieving the first backing from the backing store;
         determining whether the first backing provides collateral for an additional resource request associated with another resource chronicle by using the index to search the backing store;
         if the first backing provides collateral for the additional resource request associated with the other resource chronicle, updating the backing store to release the first backing from the resource request associated with the resource chronicle; and
         if the first backing provides collateral for only the resource request associated with the resource chronicle, updating the backing store to release the first backing from the resource provider.

5. The method for periodically updating backings for resource requests of claim 4, wherein the backings comprise at least one of real property, personal property, securities, treasury notes, automobiles, motor homes, boats, or airplanes.

6. The method for periodically updating backings for resource requests of claim 4, wherein the resource request is for a residential, business, equipment, vehicle, or personal loan.

7. A non-transitory computer-readable medium having sets of instructions stored thereon for periodically updating backings for resource requests which, when executed by a computer, cause the computer to perform actions of:
  storing, by a resource chronicle store, a plurality of resource chronicles, wherein each resource chronicle of the plurality of resource chronicles is associated with a resource request, and wherein each resource request comprises a resource value;
  storing, by a backing store, a plurality of backings, wherein each backing of the plurality of backings provides collateral for at least one resource request, and the plurality of backings are indexed based on at least one of ownership, type, value, performance, resource request, or institute;
  processing, by a backing manager, for each resource chronicle of the plurality of resource chronicles, to perform actions of:
    retrieving the resource chronicle from the resource chronicle store;
    determining that the resource request associated with the resource chronicle has a fulfilled status when a resource requestor has reimbursed a resource provider for the resource value;
    releasing one or more first backings that provide collateral for the resource request associated with the resource chronicle by:
      retrieving the first backing from the backing store;
      determining whether the first backing provides collateral for an additional resource request associated with another resource chronicle by using the index to search the backing store;
      if the first backing provides collateral for the additional resource request associated with the other resource chronicle, updating the backing store to release the first backing from the resource request associated with the resource chronicle; and
      if the first backing provides collateral for only the resource request associated with the resource chronicle, updating the backing store to release the first backing from the resource provider.

8. The non-transitory computer-readable medium having sets of instructions stored thereon for periodically updating backings for resource requests of claim 7, wherein the backings comprise at least one of real property, personal property, securities, treasury notes, automobiles, motor homes, boats, or airplanes.

9. The non-transitory computer-readable medium having sets of instructions stored thereon for periodically updating backings for resource requests of claim 7, wherein the resource request is for a residential, business, equipment, vehicle, or personal loan.

10. The system for periodically updating backings for resource requests of claim 1, further comprising a content manager running on the one or more processors that, for one resource chronicle of the plurality of resource chronicles:
  determines a set of content objects required for completion of the resource request associated with the resource chronicle, each content object of the set of content objects including a file with information pertaining to the resource request;
  generates a set of buckets, wherein a bucket of the set of buckets is generated for each content object of the set of content objects, the bucket being associated with a name and being configured to receive an associated content object, wherein a status of the bucket defined to be empty prior to receiving the associated content object and filled upon receiving the associated content object;
  populates the resource chronicle with the generated set of buckets;
  detects the received or generated content object;
  associates the content object with a bucket of the generated set of buckets;
  causes the bucket to receive the content object, wherein the status of the bucket changes from empty to filled; and
  presents a presentation that includes representations of the generated set of buckets to a user, wherein representations of one or more buckets of the generated set of buckets with filled statuses differ from representations of one or more other buckets of the generated set of buckets with empty statuses, wherein the presentation indicates which content objects of the set of content objects required for completion of the resource request must still be received.

11. The method for periodically updating backings for resource requests of claim 4, further comprising, for one resource chronicle of the plurality of resource chronicles:
  determining a set of content objects required for completion of the resource request associated with the resource chronicle, each content object of the set of content objects including a file with information pertaining to the resource request;
  generating a set of buckets using one or more processors, wherein a bucket of the set of buckets is generated for each content object of the set of content objects, the bucket comprising a name and being configured to receive an associated content object, wherein a status of the bucket defined to be empty prior to receiving the associated content object and filled upon receiving the associated content object;
  populating, using the one or more processors, the resource chronicle with the generated set of buckets;
  detecting a content object generated or received based on an interaction between a user and an interface;
  associating the content object with a bucket of the generated set of buckets;
  causing the bucket to receive the content object, wherein the status of the bucket changes from empty to filled; and
  presenting a presentation that includes representations of the generated set of buckets to a user, wherein representations of one or more buckets of the generated set of buckets with filled statuses differ from representations of one or more other buckets of the generated set of buckets with empty statuses, wherein the presentation indicates which content objects of the set of content objects required for completion of the resource request must still be received.

12. The non-transitory computer-readable medium having sets of instructions stored thereon for periodically updating backings for resource requests of claim 7, wherein the sets of instructions further cause the computer to perform actions of, for one resource chronicle of the plurality of resource chronicles:
  determining a set of content objects required for completion of the resource request associated with the resource chronicle, each content object of the set of content objects including a file with information pertaining to the resource request;

generating a set of buckets wherein a bucket of the set of buckets is generated for each content object of the set of content objects, the bucket comprising a name and being configured to receive an associated content object, wherein a status of the bucket defined to be empty prior to receiving the associated content object and filled upon receiving the associated content object;

populating the resource chronicle with the generated set of buckets;

detecting a content object generated or received based on interaction between a user and an interface;

associating the content object with a bucket of the generated set of buckets;

causing the bucket to receive the content object, wherein the status of the bucket changes from empty to filled; and presenting a presentation that includes representations of the generated set of buckets to a user, wherein representations of one or more buckets of the generated set of buckets with filled statuses differ from representations of one or more other buckets of the generated set of buckets with empty statuses, wherein the presentation indicates which content objects of the set of content objects required for completion of the resource request must still be received.

13. The system for periodically updating backings for resource requests of claim 1, further comprising:

a linking processor connected to a resource provider device over a network, wherein the linking processor, in response to receiving one resource request from a resource requestor device:

configures an interconnect web to include a plurality of nodes and a plurality of links interconnecting the plurality of nodes, wherein each node of the plurality of nodes corresponds to an entity that is a person, business, or organization;

identifies a first link between a first node that corresponds to a first entity and a requestor node that corresponds to a resource requestor, wherein the first link represents a first existing relationship between the first entity and the resource requestor, and wherein the first entity is a first person, business, or organization, and identifies a second link between a second node that corresponds to a second entity and the requestor node that corresponds to the resource requestor, wherein the second link represents a second existing relationship between the second entity and the resource requestor, and wherein the second entity is a second person, business, or organization; and an outcome score module that, for each resource request:

determines a first score of the first entity as a function of the first link and a resource associated with the resource request;

determines a second score of the second entity as a function of the second link and the resource associated with the resource request;

calculates a first weight as a function of the first link;

calculates a second weight as a function of the second link;

generates an outcome score by combining the first score and the second score as a function of the first weight and the second weight, wherein the outcome score is a measure of a level of risk of a resource provider providing the resource to the resource requestor; and causes, over the network, the outcome score to be displayed on the resource provider device, wherein the resource provider device causes, over the network, a response to appear on the resource requestor device.

14. The method for periodically updating backings for resource requests of claim 4, further comprising, for one resource request:

receiving, over a network, the resource request from a resource requestor device;

configuring an interconnect web to include a plurality of nodes and a plurality of links interconnecting the plurality of nodes, wherein each node of the plurality of nodes corresponds to an entity that is a person, business, or organization;

identifying a first link between a first node that corresponds to a first entity and a requestor node that corresponds to a resource requestor, wherein the first link represents a first existing relationship between the first entity and the resource requestor, and wherein the first entity is a first person, business, or organization;

identifying a second link between a second node that corresponds to a second entity and the requestor node that corresponds to the resource requestor, wherein the second link represents a second existing relationship between the second entity and the resource requestor, and wherein the second entity is a second person, business, or organization;

determining a first score of the first entity as a function of the first link and a resource associated with the resource request;

determining a second score of the second entity as a function of the second link and the resource associated with the resource request;

calculating a first weight as a function of the first link;

calculating a second weight as a function of the second link;

generating an outcome score by combining the first score and the second score as a function of the first weight and the second weight, wherein the outcome score is a measure of a level of risk of a resource provider providing the resource to the resource requestor; and causing, over the network, the outcome score to be displayed on a resource provider device, wherein the resource provider device causes, over the network, a response to appear on the resource requestor device.

15. The non-transitory computer-readable medium having sets of instructions stored thereon for periodically updating backings for resource requests of claim 7, wherein the sets of instructions further cause the computer to perform actions of, for one resource request:

receiving, over a network, the resource request from a resource requestor device, by a resource provider device;

configuring an interconnect web to include a plurality of nodes and a plurality of links interconnecting the plurality of nodes, wherein each node of the plurality of nodes corresponds to an entity that is a person, business, or organization;

identifying a first link between a first node that corresponds to a first entity and a requestor node that corresponds to a resource requestor, wherein the first link represents a first existing relationship between the first entity and the resource requestor, and wherein the first entity is a first person, business, or organization, and identifying a second link between a second node that corresponds to a second entity and the requestor node that corresponds to the resource requestor, wherein the second link represents a second existing relationship between the second entity and the resource requestor, and wherein the second entity is a second person, business, or organization;

determining a first score of the first entity as a function of the first link and a resource associated with the resource request;

determining a second score of the second entity as a function of the second link and the resource associated with the resource request;

calculating a first weight as a function of the first link;

calculating a second weight as a function of the second link;

generating an outcome score by combining the first score and the second score as a function of the first weight and the second weight, wherein the outcome score is a measure of a level of risk of a resource provider providing the resource to the resource requestor; and causing, over the network, the outcome score to be displayed on the resource provider device, wherein the resource provider device causes, over the network, a response to appear on the resource requestor device.

* * * * *